United States Patent [19]

Callahan et al.

[11] Patent Number: 5,225,765

[45] Date of Patent: Jul. 6, 1993

[54] INDUCTORLESS CONTROLLED TRANSITION AND OTHER LIGHT DIMMERS

[76] Inventors: Michael Callahan, 201 W. 85th, New York, N.Y. 10024; John K. Chester, 331A Warren St., Brooklyn, N.Y. 11201; Robert M. Goddard, 330 First Ave., New York, N.Y. 10009

[21] Appl. No.: 796,766

[22] Filed: Nov. 25, 1991

Related U.S. Application Data

[63] Continuation of Ser. No. 615,517, Nov. 19, 1990, abandoned, which is a continuation of Ser. No. 336,014, Apr. 10, 1989, Pat. No. 4,975,629, which is a continuation-in-part of Ser. No. 943,381, Dec. 17, 1986, Pat. No. 4,823,069, which is a continuation-in-part of Ser. No. 640,978, Aug. 15, 1984, Pat. No. 4,633,161.

[51] Int. Cl.⁵ .............................................. G05F 1/10
[52] U.S. Cl. ...................................... 323/235; 307/647; 315/194; 323/242
[58] Field of Search ............... 323/235, 237, 239, 242, 323/267, 268, 271; 315/195, 199, 294, 295, 312, 317; 307/647

[56] References Cited

U.S. PATENT DOCUMENTS

| | | | |
|---|---|---|---|
| 3,142,781 | 7/1964 | Izenour | 315/194 |
| 3,193,728 | 7/1965 | Skirpan | 315/251 |
| 3,200,327 | 8/1965 | Fleming | 323/89 |
| 3,243,653 | 3/1966 | Locklin | 315/194 |
| 3,256,463 | 2/1966 | Davis | 315/158 |
| 3,274,484 | 9/1966 | Gebhardt et al. | 323/93 |
| 3,397,344 | 8/1968 | Skirpan | 315/194 |
| 3,667,030 | 5/1972 | Gordon et al. | 323/24 |
| 3,691,404 | 9/1972 | Swygert, Jr. | 307/252 |
| 3,706,913 | 12/1972 | Malatchi | 323/237 |
| 3,733,528 | 5/1973 | Gilbreath | 323/242 |
| 3,821,601 | 6/1974 | Kappenhagen et al. | 315/311 |
| 3,845,351 | 10/1974 | Von Ballmoas et al. | 315/293 |
| 3,879,652 | 4/1975 | Billings | 307/252 OA |
| 3,898,416 | 8/1975 | Nakasone | 315/194 |
| 3,924,120 | 12/1975 | Cox, III | 250/199 |
| 3,943,397 | 3/1976 | Yancey | 315/317 |
| 3,990,000 | 11/1976 | Digneffe | 323/325 |
| 4,057,751 | 11/1977 | Bonsignore et al. | 315/294 |
| 4,080,548 | 3/1978 | Johnson | 315/68 |
| 4,086,526 | 4/1978 | Grüdelbach | 323/34 |
| 4,219,761 | 8/1980 | Mustoe | 315/307 |
| 4,241,295 | 12/1980 | Williams, Jr. | 315/294 |
| 4,287,468 | 9/1981 | Sherman | 323/322 |
| 4,325,021 | 4/1982 | McMackin | 323/351 |
| 4,331,914 | 5/1982 | Huber | 323/324 |
| 4,355,309 | 10/1982 | Hughey et al. | 340/825.53 |
| 4,392,187 | 7/1983 | Bornhorst | 363/233 |
| 4,423,478 | 12/1983 | Bullock et al. | 363/89 |
| 4,438,356 | 3/1984 | Fleisher | 307/571 |
| 4,447,765 | 5/1984 | Cote | 315/240 |
| 4,450,384 | 5/1984 | Krokaugger | 315/327 |
| 4,484,190 | 11/1984 | Bedard | 340/825.57 |
| 4,500,802 | 2/1985 | Janutka | 307/571 |

(List continued on next page.)

FOREIGN PATENT DOCUMENTS

EPA143528  6/1981  European Pat. Off. .
56-148172  11/1981  Japan .
1332412  11/1971  United Kingdom .

OTHER PUBLICATIONS

"Bright New World?—Part III", M. Callahan, Lighting Dimensions magazine, vol. VII, No. 3, Jun. 1983, pp. 35–42.

(List continued on next page.)

*Primary Examiner*—Marc S. Hoff
*Attorney, Agent, or Firm*—Kenyon & Kenyon

[57] ABSTRACT

A light dimmer, especially useful for entertainment lighting, provides a high degree of stability in dimmer performance by employing a high level of analog negative feedback and correcting for the undesirable effects on dimmer "curve" by precompensating the input value while it is digital. A lighting control system distributes both the alternating current supply and control signals representing desired adjustments to fixture intensity via a housing common to multiple enclosures. Each enclosure contains at least one dimmer and mechanically engages the housing, from which it obtains a power input via power contacts and a control signal via an electrically isolated coupling comprising an effective source on the housing and detector on the enclosure.

24 Claims, 19 Drawing Sheets

U.S. PATENT DOCUMENTS

| | | | |
|---|---|---|---|
| 4,504,779 | 3/1985 | Haman | 323/349 |
| 4,528,494 | 7/1985 | Bloomer | 323/237 |
| 4,540,893 | 9/1985 | Bloomer | 307/255 |
| 4,547,828 | 10/1985 | Bloomer | 361/86 |
| 4,567,425 | 1/1986 | Bloomer | 323/237 |
| 4,598,345 | 7/1986 | Kleeman | 362/233 |
| 4,617,508 | 10/1986 | Bloomer | 323/237 |
| 4,633,161 | 12/1986 | Callahan et al. | 323/242 |
| 4,649,302 | 3/1987 | Damiano | 307/584 |
| 4,688,154 | 8/1987 | Nilssen | 362/147 |
| 4,688,161 | 8/1987 | Covington | 363/37 |
| 4,689,547 | 8/1987 | Rowen et al. | 323/239 |
| 4,704,656 | 11/1987 | Neiger | 361/173 |
| 4,705,960 | 11/1987 | Lovrenich | 307/149 |
| 4,823,069 | 4/1989 | Callahan et al. | 323/235 |
| 4,931,916 | 6/1990 | Callahan | 363/272 |
| 4,972,125 | 11/1990 | Cunningham et al. | 315/291 |
| 4,975,629 | 12/1990 | Callahan et al. | 323/235 |
| 4,977,484 | 11/1990 | Cunningham et al. | 361/429 |
| 4,984,143 | 1/1991 | Richardson | 362/293 |
| 5,005,211 | 4/1991 | Yuhasz | 455/603 |

OTHER PUBLICATIONS

TBA Technology, "Magic Lantern, The Low Voltage Solution" brochure, undated.

Lighting Methods, Inc., L86/I5M data sheet, undated.

Electronics Diversified, Inc., "Problem/Solution" USITT TD&T publication, Winter 1991, Vol. XXVII, No. 1, p. 22.

Electronics Diversified, Inc., "Omega", Theatre Crafts Directory, Jun./Jul. 1988, vol. 22, No. 6, p. 69.

Comprehensive Video Supply Co. IR-1000 Dimmer listing, Lighting Dimensions 1985/86 Buyers Guide & Directory, Sep. 1, 1985, vol. IX, No. 5, p. 151.

"Product Report Union Connector's SU-1/DIGI-1" Reprinted from Theatre Crafts magazine, May 1984.

Union Connector Co., Inc., Series 2400 Wireless Remote Control Stage Lighting System data sheet, 1984.

"Skirpan Design Fills TV Gap" Reprinted from TV Technology, Aug. 1984.

Union Connector Co., Inc., Unitrol Dimming System brochure, 1986.

"Power Supply Aspects of Semiconductor Equipment", H. A. Gauper, Jr., J. D. Harden, Jr., A. M. McQuarrie, IEEE Spectrum (USA), vol. 8, No. 10, pp. 32–43, (Oct. 1971).

"Lamp Acoustical Noise and the Reverse Phase Controlled Dimmer", R. M. Burkhart, R. W. Burtness, 1971 Sixth Annual Meeting of the IEEE Industry and General Applications Group, Cleveland, Ohio, USA, Oct. 18–21, 1971 (New York, USA: IEEE 1971) pp. 949–966.

"Lamp Acoustical Noise and the Reverse Phase Controlled Dimmer", R. M. Burkhart, R. W. Burtness, IEEE Trans. Ind. Appl. (USA), vol. 1A-8, No. 1, pp. 84–88, (Jan.–Feb. 1972).

"Reverse Phase Control Dimmer for Incandescent Lighting", R. M. Burkhart, D. L. Ostrodka, Industrial Applications Society IEE-IAS Annual Meeting, Toronto, Ontario, Canada, 1–5, Oct. 1978 (New York, USA: IEEE 1978) pp. 614–617.

"Reverse Phase Control Dimmer for Incandescent Lighting", R. M. Burkhart, D. L. Ostrodka, IEEE Trans. Ind. Appl. (USA), vol. 1A-5, No. 5, pp. 579–583, (Sep.–Oct. 1979).

"Using VMOS for Direct and Reverse Phase Control", C. F. Christiansen, M. Benedetti, Rev. Telegr. Electron. (Argentina), vol. 69, No. 819, pp. 499–503 (Jun. 1981).

"Power FET Controlled Dimmer for Incandescent Lamps", C. F. Christiansen, M. Benedetti, IEEE Trans. Ind. Appl. (USA), vol. 1A-19, No. 3, pt. 1, pp. 323–327, (May–Jun. 1983).

Electro Controls, QD TM Series Dimmer brochure, undated.

Strand Lighting, Lightboard XP/DC90 Dimmer brochure, undated.

Vari-Lite, Inc., VL3 Wash Luminaire data sheet, 1987.

"Stage Lighting and the State of the Art in Twenty Years", J. F. Rubin, Lighting Dimensions magazine, vol. VII, No. 1, Mar. 1983, pp. 52–60.

"Bright New World? Tour System Design for the 1980s", M. Callahan, Lighting Dimensions magazine, vol. VII, No. 1, Mar. 1983, pp. 62–73.

"Dimming and Lighting Control . . . State of What Art?", J. M. Good, III, International Technical Conference, Theatre, Television, and Film Lighting, Committee of Illuminating Engineering Society, 5 Oct. 1987, Montreal, Quebec, Canada.

Theatre Crafts magazine, vol. 20, No. 8, Oct. 1986, p. 14.

Production Arts Lighting, Inc., Model 96-2400 High Density Dimmer Rack data sheet, 83-V-6.

"Dimming Controls Provide Stage Production Sparkle", M. O'Neal, Contractor's Electrical Engineering magazine, vol. 39, No. 4, Apr. 1987, pp. 46–48.

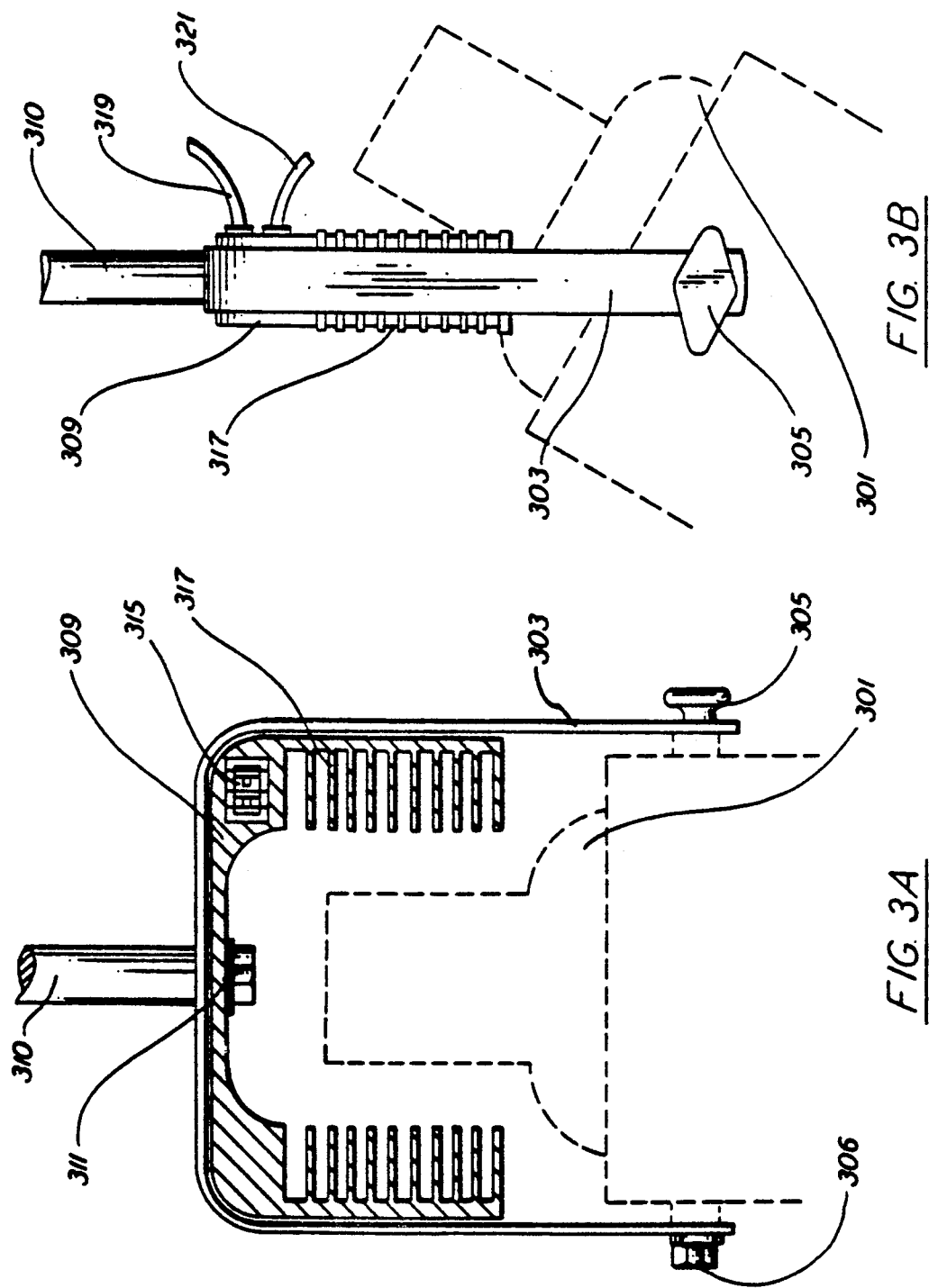

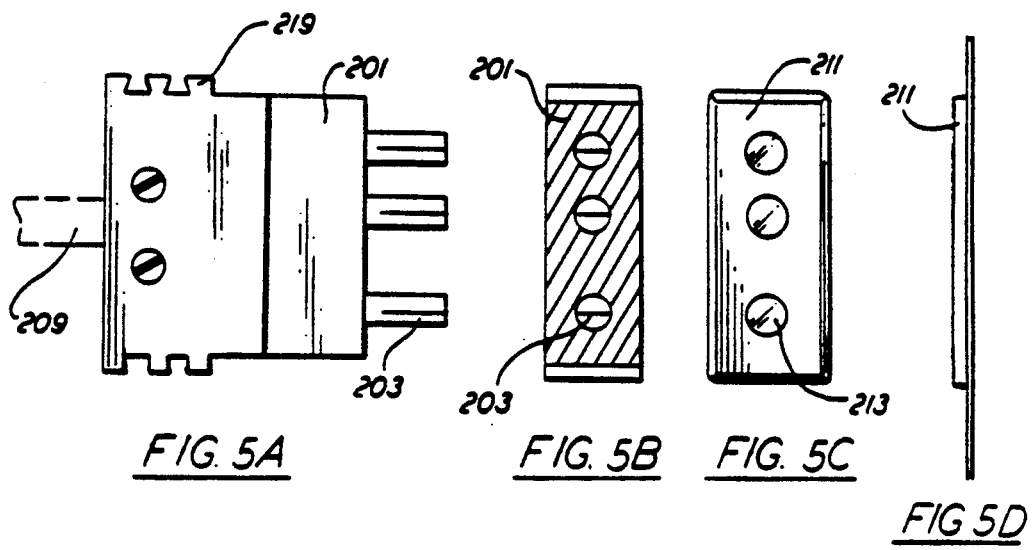
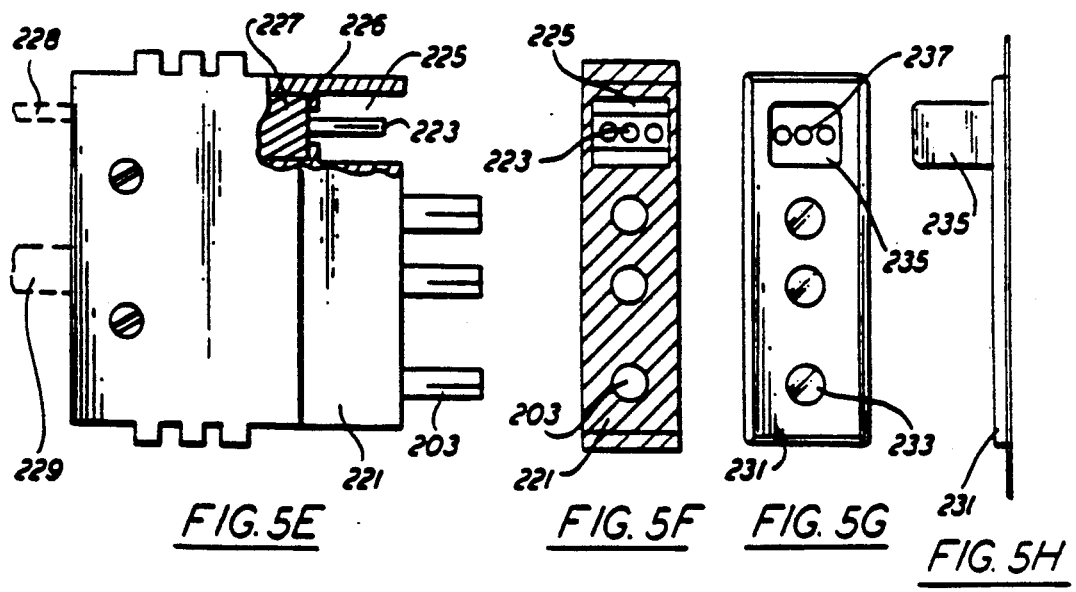
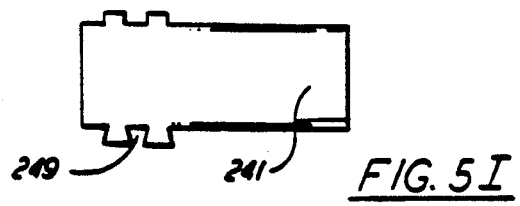

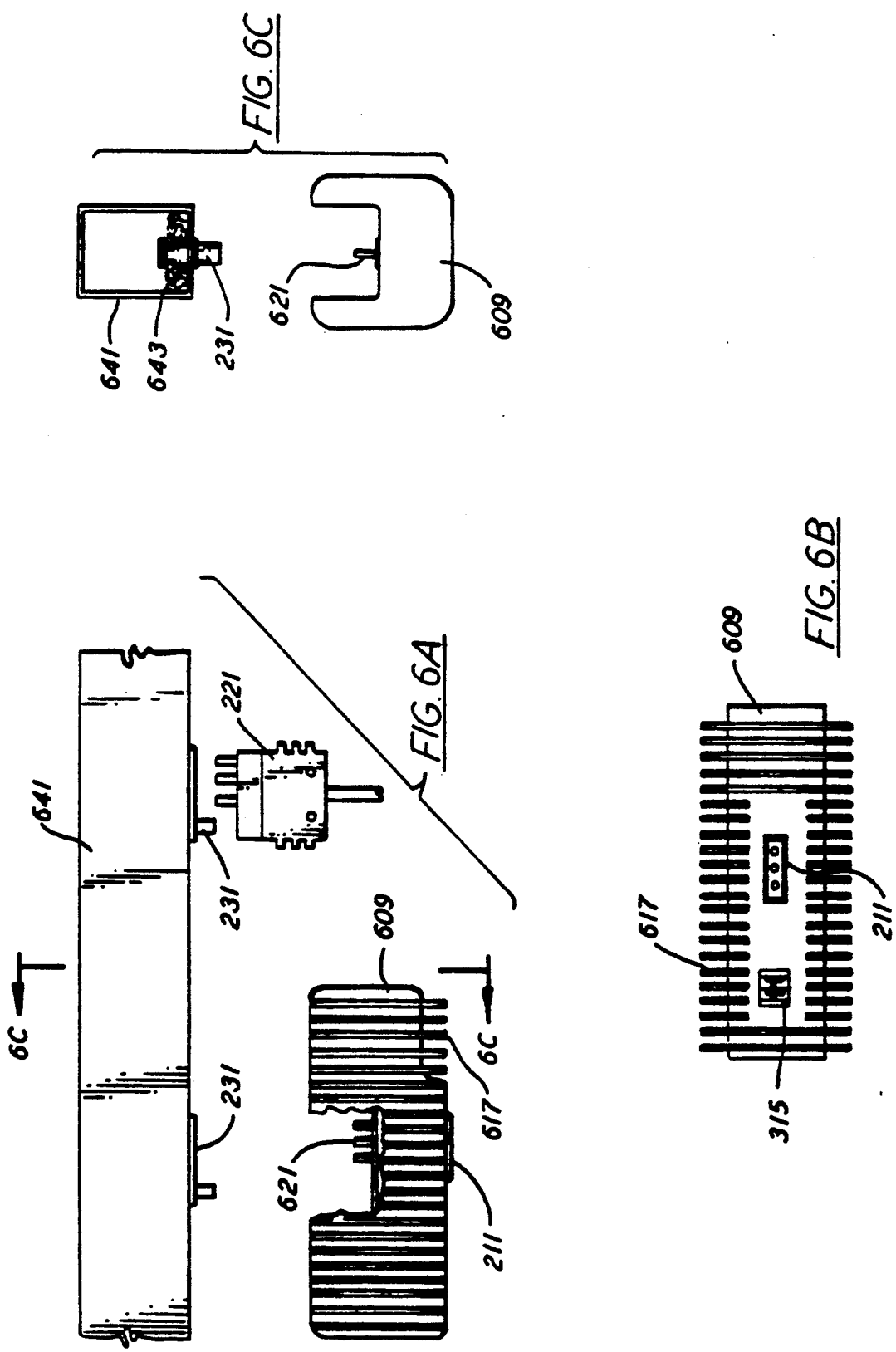

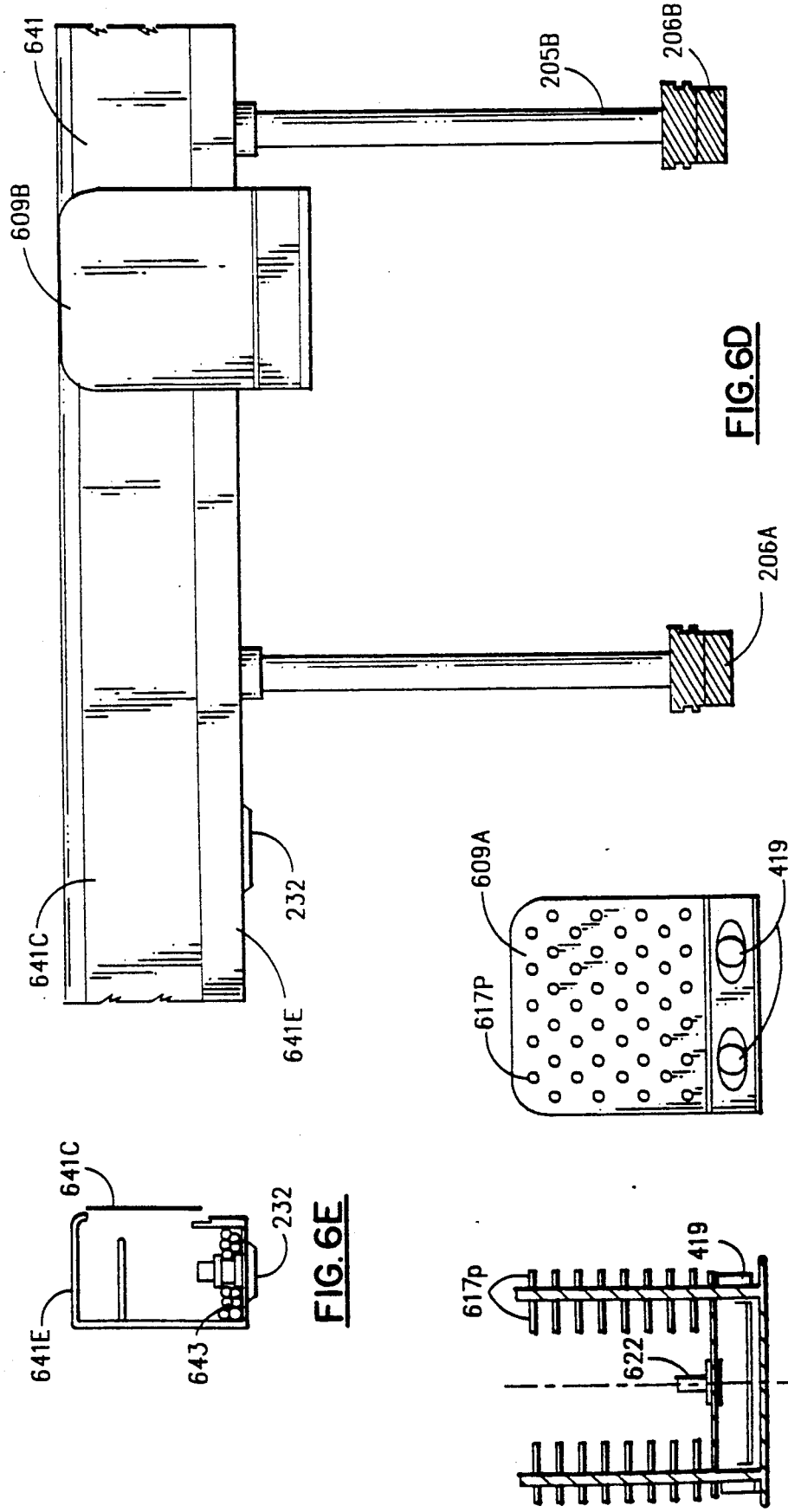

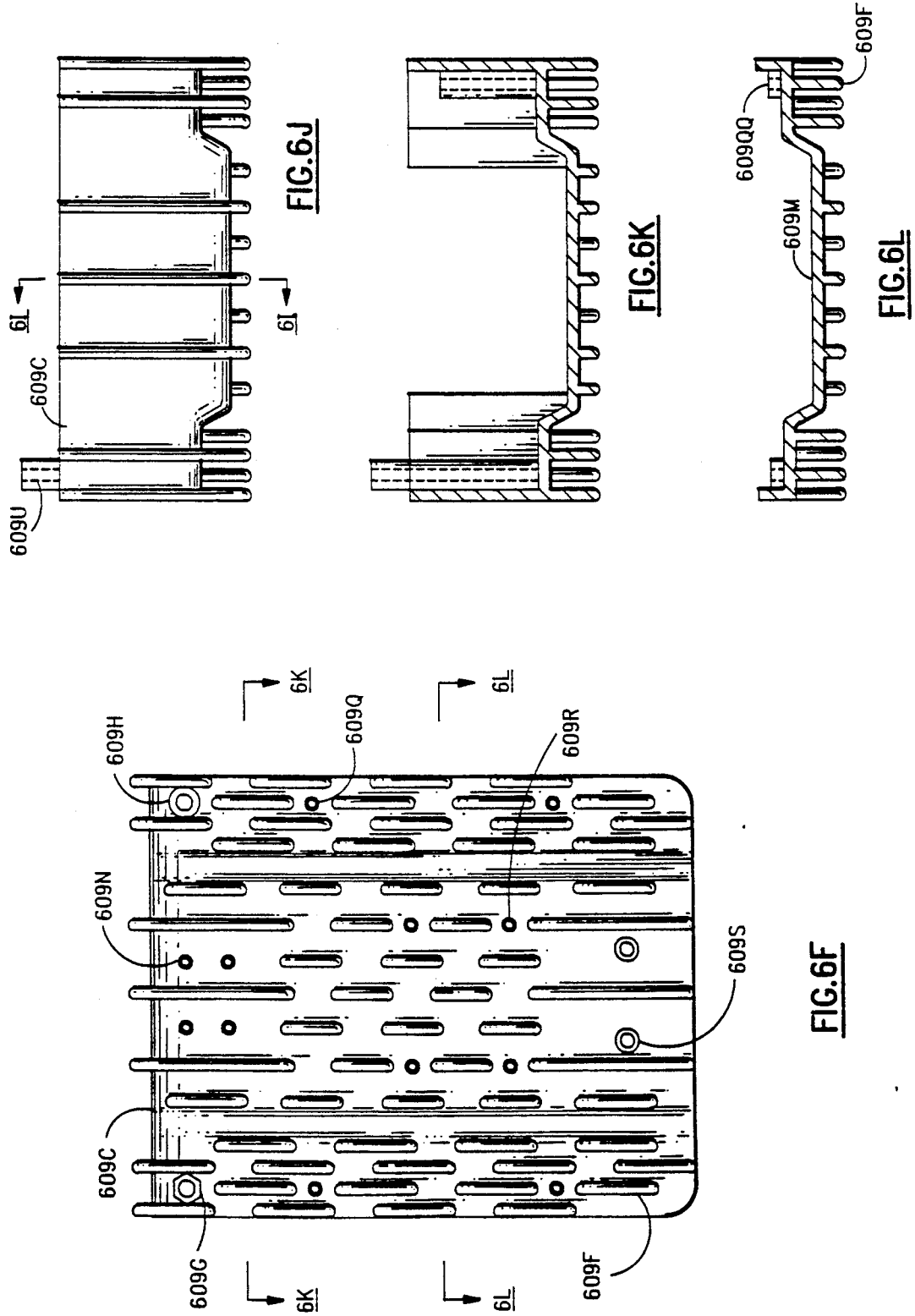

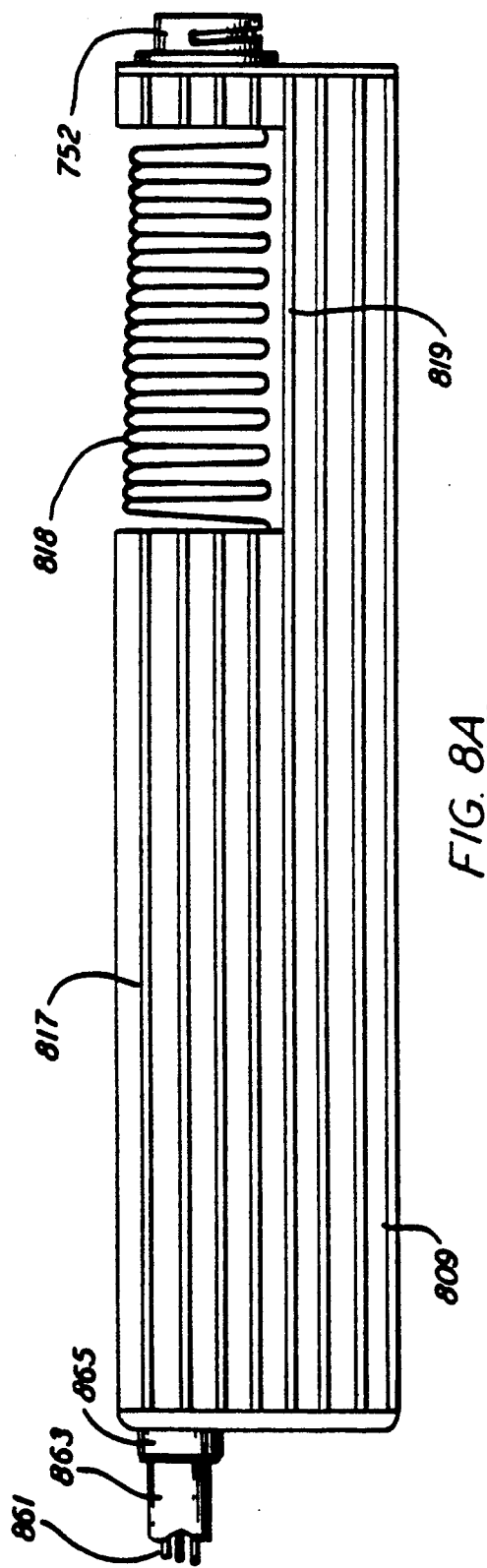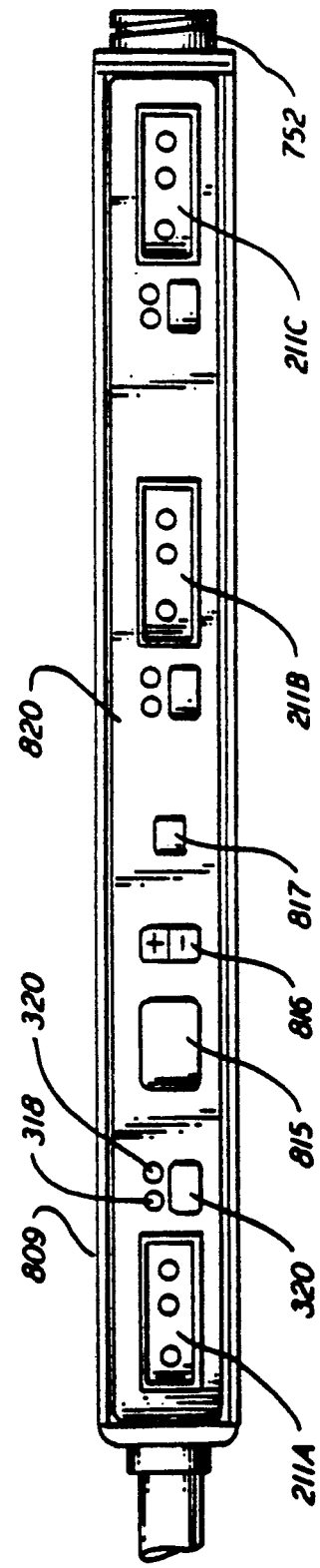
FIG. 8A
FIG. 8B

INDUCTORLESS CONTROLLED TRANSITION AND OTHER LIGHT DIMMERS

This application relates to lighting control, and more specifically to controlled transition light dimming apparatus. It represents a continuation of application Ser. No. 07/615,517, filed Nov. 19, 1990, now abandoned, which is a continuation of application Ser. No. 07/336,014, filed Apr. 10, 1989, now U.S. Pat. No. 4,975, 629, which is a continuation-in-part of application Ser. No. 06/943,381, filed Dec. 17, 1986, now U.S. Pat. No. 4,823,069, which is a continuation-in-part of application Ser. No. 06/640,978, filed Aug. 15, 1984, now U.S. Pat. No. 4,633,161, included in their entirety by reference, and contains additional material in Disclosure Documents Nos. 213,965, 213,971, 215,867, and 215,941.

Prior related applications disclose various improvements to light dimmers, especially those used for entertainment lighting applications. Some of these improvements are to phase control dimmers directly controlling the duration of the transition of the semiconductor power controlling means between one and the other of its substantially conductive and substantially non-conductive conditions so as to limit EMI without the need for a conventional choke. Other improvements are applicable to the design of lamp dimmers of both the controlled transition and more conventional types, particularly those for distributed applications.

The present application discloses several such improvements addressing prior difficulties with the design of such lamp dimmers.

One improvement relates to an improved triggering circuit for lamp dimmers. It is well known that variations in the alternating current supply, the components of the dimmer itself, and in the impedance of the connected load may result in undesirable variations relative to the desired value as expressed by the value supplied to the dimmer's control input, in the actual average power supplied to the lamp load (and therefore in lamp brightness). Analog voltage feedback was long employed to correct for such variations, but, in addition to requiring voltage isolation of the sense input to the triggering stage from the dimmer's output, resulted in triggering circuits difficult to design well, less than stable in performance, and requiring regular trimming. Such disadvantages have become still more acute with the transition to dimmer-per-circuit systems, and a simple and reliable alternative has long been sought, particularly for applications in which one triggering stage is required for each power stage. The present application discloses a "precision analog dimmer" which employs previously undesirably high levels of analog feedback to achieve the required stability, while precompensating the control input value while still in the digital domain to correct for the otherwise unacceptable effect of the dimmer's high level of feedback on its "curve". The result is a uniquely simple and inexpensive triggering circuit offering many advantages.

Another disadvantage of prior art triggering circuits sensing actual line voltage, whether for analog feedback or for input to a microprocessor, is the requirement for voltage isolation between line voltage and the triggering circuit. In professional dimmers of the past, the control signals supplied to the input to the triggering circuit are at low voltages, and therefore the triggering stage must be operated at similar voltages. This requires isolation of the triggering circuit from line voltage by means of transformers for both power supply and to provide voltage feedback for regulation purposes from the dimmer's output to the triggering stage. Such transformers are relatively large and expensive, and suitable alternatives have been long and unsuccessfully sought. The present application discloses the use of a voltage isolation means, such as an opto-isolator, at the digital input to the triggering stage. Such isolation at this point is of minimal cost and has no effect on the performance of the dimmer, but allows the triggering card to operate at any voltage, such that the triggering card can derive voltage feedback (and power supply) without the need for transformers. Further, where the dimmer is constructed as a mechanical module that accepts its control input via a mechanical structure that distributes signals and power to a plurality of such dimmers/modules, the voltage isolation means at the control input can be located across the mechanical interface between the module and the structure such that said isolation means also serves the function of an interconnect between the two, with unique advantages. Where the two halves of the voltage isolation means require alignment with each other, the same means used to mechanically align the module and the structure, especially for mating of power contacts, can align the isolation means. For this purpose, the isolation means may be made integral with the power contact assembly. Further, the function of the control input need not be limited to the transmission of dimmer values. Where the modular dimmer is located in proximity to the lamp, the means used to distribute control signals to the dimmer may be used to distribute control signals for accessories (such as a color-changer) used with the same fixture, and the dimmer module may incorporate means to supply that accessory with its control signals.

Various methods suitable for separately addressing dimmer modules and of simplifying the distribution of data to them, applicable to both centralized modular racks and fully distributed systems are also disclosed.

Other features and advantages of the disclosed improvements will become apparent.

DESCRIPTION OF THE DRAWINGS

FIG. 3A is a front elevation of a mechanical embodiment adapted for mounting within the yoke of a fixture.

FIG. 3B is a side elevation of the embodiment of FIG. 3A.

FIG. 5A is a side elevation of a typical prior art power connector.

FIG. 5B is a front elevation of the power connector of FIG. 5A.

FIG. 5C is a front elevation of a prior art power receptacle.

FIG. 5D is a side elevation of the power receptacle of FIG. 5C.

FIG. 5E is a side elevation of a combined power and signal connector. FIG. 5F is a front elevation of the combined power and signal connector of FIG. 5E.

FIG. 5G is a front elevation of a combined power and signal receptacle.

FIG. 5H is a side elevation of the combined power and signal receptacle of FIG. 5G.

FIG. 5I is a side elevation of a signal connector.

FIG. 6A is a side elevation of a mechanical embodiment adapted for raceway use.

FIG. 6B is a reverse plan view of the dimmer of FIG. 6A.

FIG. 6C is a sectional view of FIG. 6A.

FIG. 6D is a side elevation of a second variation of a dimmer adapted for raceway use.

FIG. 6D(*a*) is a section through a possible embodiment of dimmer enclosure 609B of FIG. 6D.

FIG. 6D(*b*) is a side elevation of the dimmer enclosure 609B of FIG. 6D(*a*).

FIG. 6E is a sectional view of FIG. 6F.

FIG. 6F is a side elevation of a third variation of a dimmer adapted for raceway use.

FIG. 6J is a plan view of the casting of FIG. 6F.

FIG. 6K is a section through the casting of FIG. 6F showing the compartment for electronics.

FIG. 6L is a section through the casting of FIG. 6F showing the surface for mounting semiconductor power devices.

FIG. 8A is a plan view of a mechanical embodiment adapted for portable theatrical use.

FIG. 8B is a front elevation of the embodiment of FIG. 8A.

FIG. 8F(*a*) is a diagram illustrating an alternate design for the area of enclosure 809E of FIG. 8F to which semiconductor power device 519F is attached.

DETAILED DESCRIPTION

Referring again to FIG. 1A, the drive or triggering circuit 404 may be analog open loop; or, with the appropriate sense input analog fed-back (as disclosed in U.S. Pat. No. 3,397,344); or digital (as disclosed in U.S. Pat. No. 4,241,295).

The means to control the transition, illustrated as transition control means 406, may comprise a separate hardware circuit, whether analog, digital, or a software function; or it may be partially or fully integrated into the triggering circuitry or the device drivers.

Similarly, the output devices, illustrated as power controller means 419, may be of any known type suitable for the purpose.

Such devices must satisfy certain basic requirements. Foremost is the ability to withstand the high instantaneous power dissipation which is characteristic of the power stage's operation, for while the thermal load is relatively modest if averaged across the half-cycle, it is concentrated in the transition period.

Given both suitable instantaneous and average power ratings, devices are then selected on the basis of drive characteristics, protection characteristics, and conduction losses.

Over the longer term, the use of devices fabricated on silicon carbide or diamond film will be attractive, in that they permit far higher operating temperatures, permitting the use of substantially smaller heat sinks.

Figure 1A:
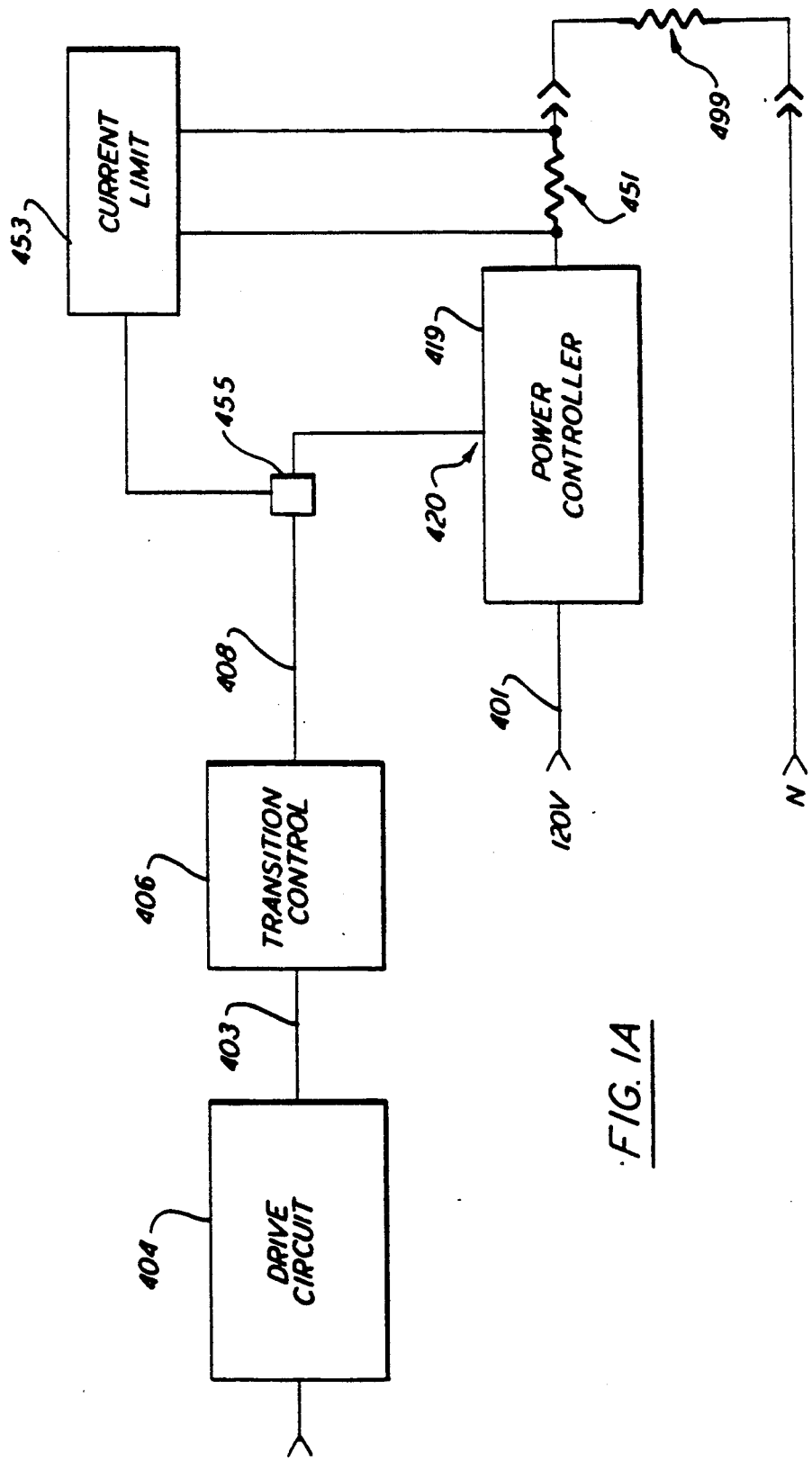
FIG. 1A is a block diagram of a controlled transition dimmer.
Figure 1B:
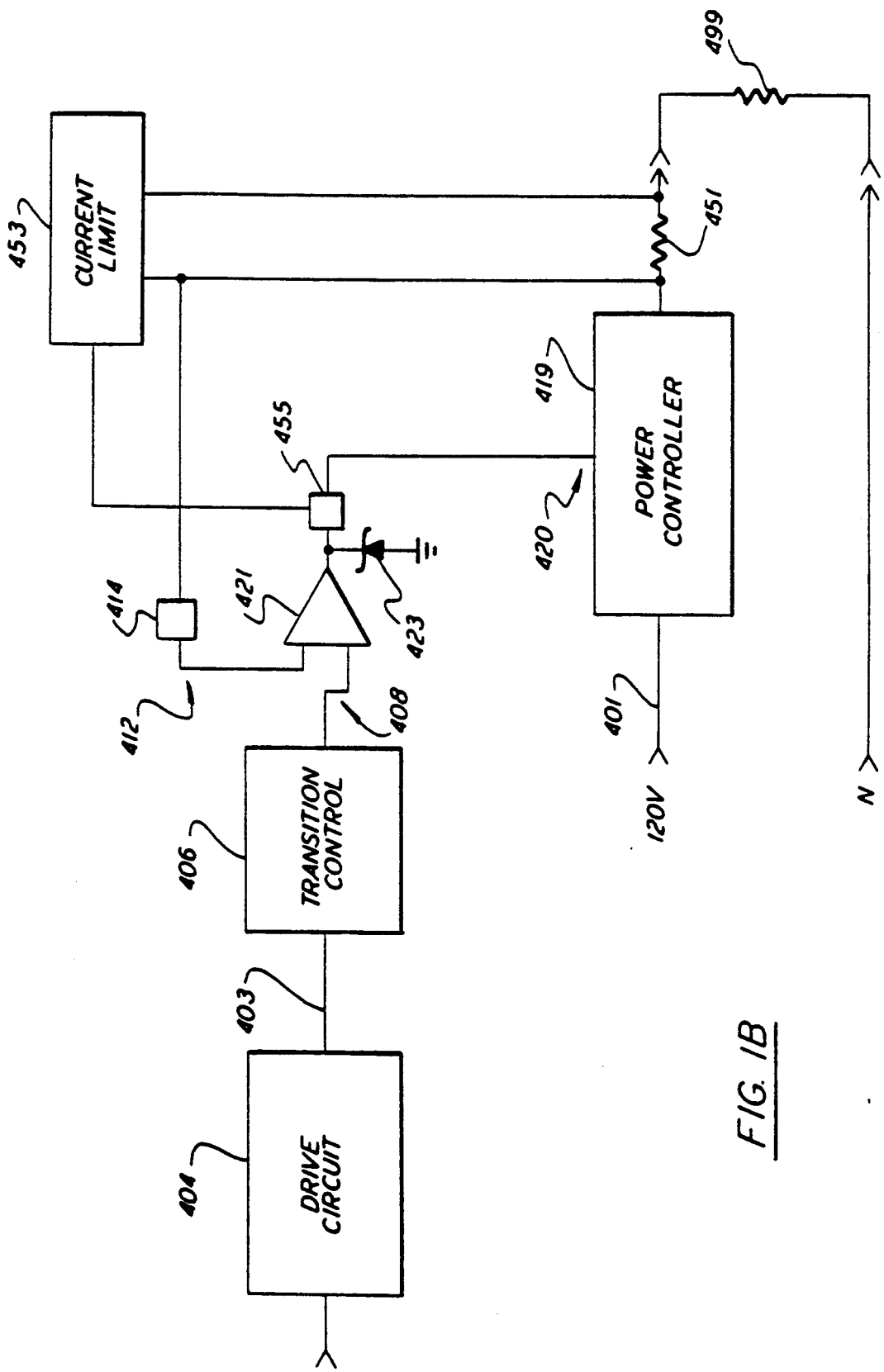
FIG. 1B is a block diagram of a controlled transition dimmer adapted for the use of power devices with an input voltage/output current relationship.

Refer now to FIG. 1B, a block diagram of the improved dimmer of the present invention adapted for the use of devices having an input voltage/output current relationship, such as field effect devices. Parts with the same function in FIG. 1A are identified with the same reference number.

The input voltage at the gate of a field effect device controls its output current. Therefore, for a given input voltage in the device's linear region, the actual voltage at load 499 is a factor of the impedance it presents, which varies with the number of filaments connected and their temperature. This mechanism has no effect on the dimmer when off or in full conduction, but during the transition period it results in variations in the duration of the transition with variations in the load impedance - and as such, undesirable variations in average power, audible lamp noise, and thermal losses in the devices.

Although dimmers with overall feedback in the triggering circuit (such as disclosed in U.S. Pat. No. 3,397,344) compensate for the effect on average power, they do not correct for the variation in the duration of the transition, and with it, variations in audible noise and thermal losses.

Preferably a controlled transition power stage corrects this variation by controlling the rate at which voltage rises (or falls) during the transition. This object may be achieved by the use of a semiconductor power controlling means with an input voltage/output voltage relationship (such as a power transistor in an emitter-follower relationship). Where devices having an input voltage/output current relationship are employed, means for this correction is required, illustrated in FIG. 1B as a transition feedback circuit comprising differential amplifier 421 interposed between transition control means 406 and the gate input 420 of the power devices 419, accepting as its second input, the dimmer output voltage via conductor 412 and feedback network 414. Feedback network 414 shapes, rectifies, or attenuates the load voltage derived from load 499, as may be required. Some embodiments will provide two means analagous to amplifier 421 and network 414, one provided for each half-cycle. The actual output voltage produced by the interaction of the current resulting from a given gate input voltage with the impedance of load 499 is compared with the desired value, and the gate input voltage corrected accordingly. Such a power stage is therefore capable of maintaining the same duration of transition at each phase angle and as such, consistent curve, audible noise, thermal losses and EMI suppression despite variations in load impedance.

The gate voltage/output current relationship of field effect devices also permits limiting output current by limiting maximum gate input voltage. Accordingly, FIG. 1B illustrates zener diode 423 as clamping maximum gate voltage.

The parent applications No. 943,381 and grandparent application No. 640,978, now U.S. Pat. No. 4,633,161, included in their entirety by reference, disclose suitable circuits in detail.

LONG TIME CURRENT LIMIT

Figure 2A:
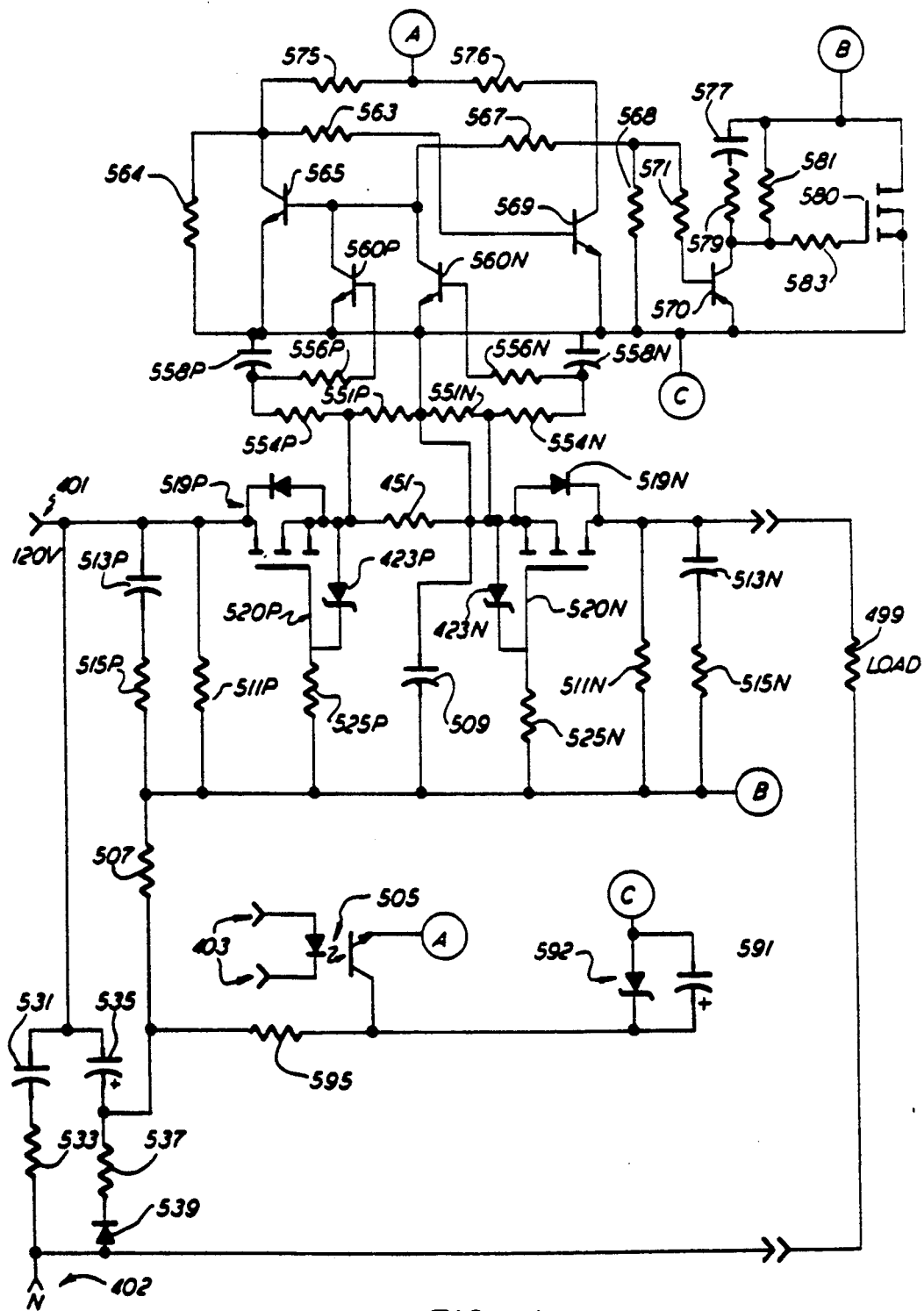
FIG. 2A is schematic of a controlled transition power stage reproduced from the prior related applications.

The dissipation limiting circuit and gate clamp illustrated in FIG. 2A of the grandparent application, now U.S. Pat. No. 4,633,161, serves to protect the power devices from fault conditions caused by abnormally low impedance, but steady state overloads such as may be produced by plugging a 2000 watt lamp into a 1000 watt rated dimmer may not cause them to trip. While a circuit breaker or conventional fuse may be employed, they serve to increase the size, complexity, and cost of the dimmer. Nor are they remotely or automatically resettable. Accordingly, it is desirable to employ a long-term current limiting method for such eventualities. Because the dissipation of a controlled transition dimmer is greatest near a 90 degree conduction angle, limiting the RMS or average current will not necessarily limit dissipation to a safe value. Therefore, this "long-term current limit" should provide due weight to the peak current, or to a current measurement taken in the second half of each half-cycle (or the first half, in the case of a "turn-off" dimmer).

IMPROVED TRIGGERING CIRCUITS

Figure 2B:
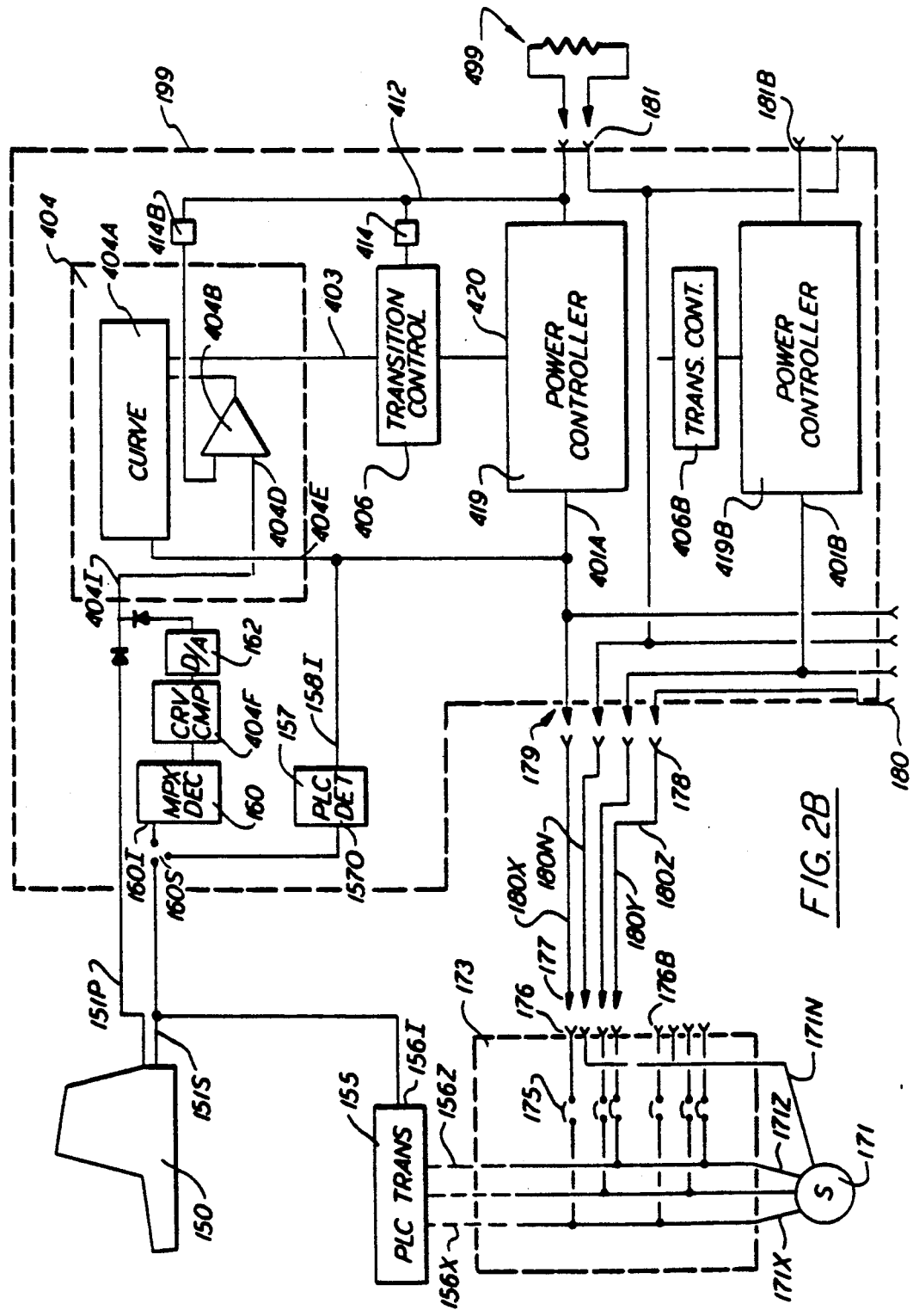
FIG. 2B is a block diagram illustrating an improved triggering circuit and typical details of a distributable dimmer system.

Refer now to FIG. 2B, where an improved triggering circuit particularly suited to distributed dimming applications is illustrated.

All phase control dimmers require a triggering circuit that functions as a timer whose delay between zero-crossing and triggering the change in state of the power device is determined by the desired average power setting (as represented by a corresponding value present at its control input).

Most prior art dimmers have employed analog circuitry for this function, but the performance of such circuits is frequently dependent upon not just circuit design but component variations and temperature.

Many dimmers (such as that disclosed in U.S. Pat. No. 3,397,344) have employed negative feedback to reduce such variations, but classical fedback triggering circuits have an inherent "curve" or family of control input value/output power relationships that is less than ideal. There has therefore been a tendency to modify such circuits to produce a more desirable curve, at the cost of stability.

Prior art analog triggering circuits, whether open-loop or fedback, have proven difficult to design well and require regular adjustment if consistent response is to be maintained, both from month-to-month and from dimmer-to-dimmer. Such consistency has become more important with the transition to dimmer-per-circuit, because the lamps on a common control channel are on separate dimmers, which emphasizes any discrepancies between them in response.

The "digital" dimmer, as generally disclosed in U.S. Pat. No. 4,241,295, is theoretically simple to design, immune to component variations, and capable of reproducing any "curve" with total consistency. Several drawbacks have, however, become apparent. One is the difficulty of providing a line regulation scheme which compensates for real-world distortions in the AC waveform, and hence total power. Overall negative feedback compensates for such variations, but while relatively simple to provide analog circuits, such feedback (or an equivalent feedforward function) is far more complex to implement in digital ones.

Digital triggering circuits also have higher parts costs than analog schemes, and therefore have generally been restricted to applications where a single triggering circuit can be shared by as many as twenty-four power stages.

A distributed dimmer system places a premium on triggering circuits which are simple in design, cost-efficient in single dimmer applications, are fully line-regulated, require little or no adjustment, and are highly consistent in response. FIG. 2B illustrates a "precision analog" triggering circuit meeting these objectives.

FIG. 2B illustrates a dimmer enclosure 199, containing one or more power stages comprising a power controller 419 with an associated transition control means 406.

The transition control means 406 accepts a phase control input via 403 from triggering means 404, which is illustrated as accepting an input via 404I, corresponding to a desired average power to be supplied to lamp load 499, and as responsive to the zero-crossing of the alternating current waveform detected via 404E.

Improved triggering means 404 is illustrated as comprising a phase angle converter 404A which determines the relationship between the desired average power condition at input 404I and the firing angle supplied to the power stage. In a known manner, negative feedback (here illustrated as a differential amplifier 404B) is used to minimize the effects of variations in both input power and dimmer performance by comparing the desired value with actual dimmer output as sensed via '412, and by advancing or retarding the phase angle as required.

Unlike prior art dimmers, the dimmer of the present invention maintains a closed loop gain of greater than 10 over its entire range of adjustment. This has the effect of greatly increasing the stability of dimmer performance over prior art, although it produces a less desirable "curve". This is corrected by deliberately distorting the control signal to the dimmer input 404I, such that the characteristic response of the feedback network restores the input value/output voltage relationships to the desired "curve". Many methods of performing this correction are possible. Here a curve correction means 404F, comprising an EPROM lookup table, is inserted in the input at the digital level, although such correction can be performed, less desirably, at the analog level.

In contrast to prior art designs, which limit closed loop gain and modify feedback network operation to maintain an acceptable "curve" at the cost of stability, the improved triggering means of the present invention uses unusually high closed loop gain to produce stability, and achieves the previously contradictory object of an acceptable curve by compensation outside the feedback network.

Further, prior art triggering stages have employed a network 414B which produces a DC voltage approximately related to (and therefore stabilizing) average voltage at the lamp. Lamp brightness is, however, determined by RMS voltage. The relationship between average and RMS voltage varies with changes in waveform shape produced by changes in firing angle, and therefore such dimmers cannot maintain stable lamp brightness with changes in line voltage. The use of a network whose output is related to RMS voltage provides the basis for more accurate regulation, but the characteristic output of such circuits would produce an unacceptable "curve". The use of such an RMS network 414B in combination with the disclosed precompensation technique permits the significant improvement in dimmer regulation produced by RMS voltage sensing, while maintaining an acceptable curve.

FIG. 2B further illustrates a typical application of such a dimmer in a distributable embodiment.

AC mains supply 171 is illustrated as supplying at least one multiple-phase branch circuit distribution panelboard 173, including circuit breakers 175 providing overcurrent protection for a plurality of branch circuits.

Distribution panelboard 173, which may be permanently installed in a facility or designed for portable use, provides for the connection of branch circuits, whether by permanently-installed raceways and conduits or by means of portable cables (such as 180) and connectors (such as panelboard receptacle 176, and cable connectors 177 and 178). Such cables and connectors may be single circuit or, as illustrated, multiple circuit. Branch circuits are provided for a plurality of dimmer enclosures 199 at spaced apart locations, each in proximity to at least one controlled fixture. The design of such enclosures may allow for plugs or inlets for power (such as 179, 621 of FIG. 6A, and 753 of FIG. 8C); outlets for lamp loads (such as 181, 211 of FIG. 6B, and 211A-C of FIG. 8B); and feed-thru outlets (such as 180, and 752 of FIG. 8A) to permit parallelling additional dimmers/enclosures to the same branch circuits.

It will be understood that many applications will involve multiple levels of branch circuit distribution. It will also be understood that a distributed dimmer enclosure may incorporate some level of branch circuit distribution itself, for example, from a 20 or 30 Ampere supply conductor to two or three 1000-watt rated dimmers.

Local potentiometers can be mounted on or located near the dimmer enclosure, but typically the system provides at least one known lighting control console 150 to specify the desired average power to be supplied to each of a plurality of controlled fixtures, and hence their intensity, together with a means to couple the output condition of the console 150 representing the desired average power for a dimmer with the input 404I of its triggering circuit 404.

This means to couple may take one of several forms, each well known in the art.

A discrete parallel output 151P of lighting console 150, typically an analog voltage varying between 0 and 10vDC, may be supplied to each dimmer or group of dimmers responsive to that given output.

A serial output 151S of lighting console 150, either analog or digital (e.g. conforming to the serial standards of the United States Institute of Theater Technology, New York, N.Y.), may be supplied to all dimmers, each dimmer or group of dimmers employing a multiplex decoder 160 which is set for its own address to recognize the appropriate desired average power value in the serial data stream.

Separate cables and connectors may be employed for power and signal or common connectors and/or cables employed.

Alternatively, a serial output of lighting console 150 may be supplied to known power line communications transmitter 155, which impresses a coded data stream on the AC supply 171 via outputs 156X-Z. Known detector circuitry 157 at the dimmer strips the data from the powerline for demultiplexing. The widely-employed "BSR" system sends commands which increment or decrement the desired average power values held in a register at the addressed dimmer. The actual desired average power value may also be transmitted.

Preferably, a common integrated circuit or package, together with switch 160S and diodes at the input 404I to triggering circuit 404 permit the dimmer to accept parallel, serial, or powerline signal inputs.

Inexpensive power line communications hardware places severe limits on maximum baud rate. Due to this limited baud rate, neither system is suitable for most professional applications because the time required for each dimmer adjustment makes it impractical to execute "cues" in which large numbers of dimmers transit from old to new values in apparent simultaneity.

If, however, a short-term memory means is provided at the dimmer, such that a plurality of desired average power values can be stored, each referenced to an identifying "preset" or "cue" number, then the output of that number by the lighting console 150 over the power line communications transmitter 155 could cause an unlimited number of dimmers to transit to new values simultaneously, well within the limited baud rate of the system.

Figure 1C:
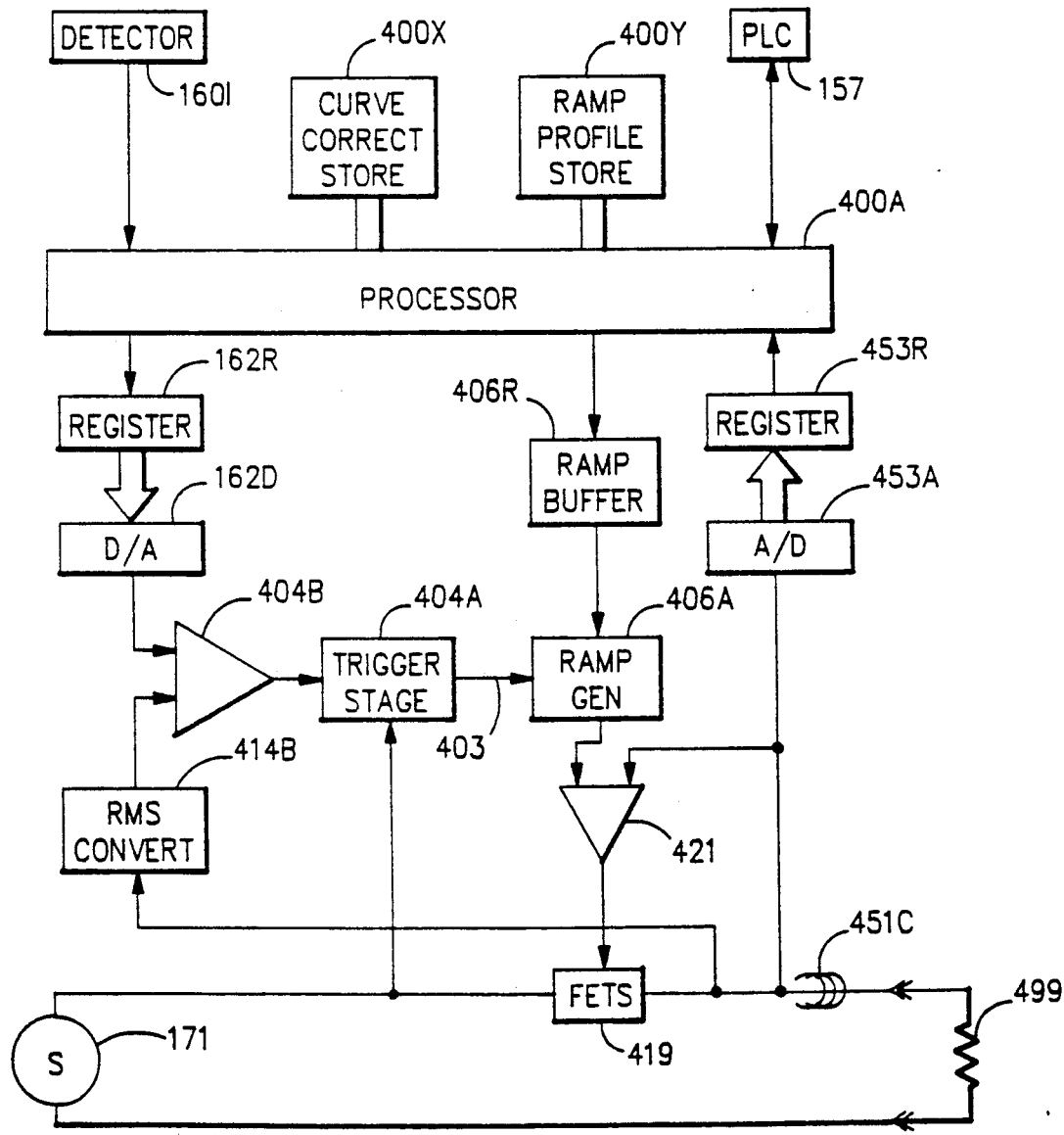
FIG. 1C is a block diagram of a controlled transition dimmer with several improvements.

Refer now to FIG. 1C, a more detailed block diagram of a dimmer incorporating various of these improvements.

At the core is a simple, known open-loop phase control triggering circuit 404A that accepts an analog voltage at its input and produces a change in the state of its output at the desired firing angle.

This triggering circuit is part of a feedback loop formed by differential amplifier 404B that compares the input value with the dimmer's output voltage.

This feedback loop has a high gain—in excess of 10:1, the advantages of which have previously been described.

A RMS-to-DC converter 414B may be placed between the input to the differential amplifier 404B and the dimmer's AC output so that the feedback loop stabilizes RMS voltage, the advantages of which have also previously been described.

A byproduct of the simple triggering circuit 404A, the unusually high network gain, and the sensing of RMS voltage is an undesirable "curve".

As previously described, this can be corrected without the prior undesirable compromise of the efficacy of the feedback loop by performing a curve correction external to that feedback loop.

In the embodiment of FIG. 2A, the digitally-expressed desired intensity value produced by the control console may serve as an index to a lookup table that contains a second value corrected for the effects of the feedback network. This corrected value is supplied to the dimmer.

It will be apparent that such a correction table, (which requires only 256 1-byte values) can be used not just to correct curves but, as there is no limit on the degree of correction, to change them.

The result is a dimmer triggering stage having a very low level of electronic complexity, and thus which can be provided on a one power stage/one triggering stage basis.

The dimmer's unusually high level of feedback can produce stability that had previously been limited to more complex processor-based "digital" dimmers, while offering the "curve on a chip" feature traditionally limited to such digital dimmers as well.

However, the disclosed dimmer has an ability to compensate for "real world" variations in the AC supply that recent dimmers that share a single triggering stage among multiple power stages—and particularly "digital" dimmers—have found it difficult or impossible to provide.

"Feedback" as to the actual state of the power output of a dimmer has traditionally been expensive to provide, even in analog dimmers, because of the requirement for voltage isolation between line voltage and the low voltage at which the triggering stage operates. This requires the use of a step-down transformer between the input to the triggering circuit and the line voltage output of the dimmer, which adds significantly to both the size and the cost of the dimmer triggering stage.

It was the size and cost of this feedback transformer which, grating against the "value engineering" requirements of high-density dimming, was one factor in the abandonment of fully fedback operation by many recent dimmers—an action that proved to have been premature.

An interim solution to the problem of voltage isolation has been the use of capacitors to provide some measure of such isolation, but has not proved an entirely satisfactory one.

Another difficulty with triggering circuit design has been the requirement for low-voltage power supply to it. As the triggering circuit must be isolated from the AC line and operate at low voltages, a DC power supply is required for its active electronics. This, in turn, required another step-down transformer in traditional dimmer design, one that further increased the size and cost of triggering stage electronics. In some systems, DC power supplies were shared among multiple triggering circuits, and the reduction in the number of power supply transformers was a not-inconsiderable benefit of centralized triggering circuit designs.

FIG. 1C illustrates how a fully-fedback individual triggering stage can be provided for each power stage without the previous requirement for either a feedback transformer or a power supply transformer.

Prior art triggering stages placed the voltage isolation barrier between the control system and the AC power line at the interface between the triggering stage and the power devices; first with pulse transformers and subsequently with optoisolators.

By moving the low-voltage/high-voltage barrier to the input instead of the output side of the triggering circuit, the triggering circuit's electronics can be allowed to float at or near line level. This permits the feedback system to be coupled to the AC output of the dimmer and the active electronics to be supplied without the requirement for a transformer for either function, at a very significant decrease in the size, weight, and cost of the triggering circuit.

There are several methods of performing that isolation at the input side of the dimmer's triggering stage.

One of the simplest is opto-isolation, which can be readily employed as most professional dimmers can accept a digital input.

FIG. 1C illustrates a dimmer whose input value, sent by an LED, is received by photodetector 160I. That value is held by register 162R, and converted to the analog input voltage to the triggering stage by D/A converter 162D.

FIG. 1C also illustrates that processor 400A can be used in the overall design of the dimmer. While such a processor can be employed, it has been seen that it is not necessary for any of the functions previously described. However, if provided, it can serve several functions, one of which would be the servicing of a serial input, and another the curve correction function.

In the latter case, the processor's Curve Correct Store 400X holds the value corrected to produce the desired "curve".

Although many of the previously-described techniques can be used with inductively-filtered power stages, the power stage illustrated in FIG. 1C is of the "controlled transition" type.

The output of the triggering stage is provided to a transition control section. This includes a ramp generator 406A that is responsible for producing a transition with the desired profile. That profile or the values required to calculate it are stored in Ramp Profile Store 400Y and provided by the processor to a buffer store 406R. Upon the state change at the output of the triggering stage, ramp generator 406A produces a transition of the semiconductor power devices 419 between their non-conductive and conductive states having the specified profile. Current sensor 451C and comparator 421 form a second feedback loop that is responsible for compensating for variations in device performance and load impedance. Current information will also be used for current-limiting.

Because the processor is provided with the desired intensity value and specifies the transition ramp profile, the duration of that transition can readily be varied across the range of possible phase angles to maximize EMI suppression.

By predetermining the maximum duration allowable within the dissipation "budget" at each phase angle, and by programming, for example, a duration multiplier value indexed to each such phase angle, the processor or ramp generator can "stretch" the specified transition ramp profile over the maximum allowable duration.

Clearly, these functions can be provided entirely in hardware without a processor as well.

It is also possible to vary the shape of the transition ramp profile over the range of phase angles, either by means of a correction factor and/or by storing additional profiles in Ramp Profile Store 400Y, each indexed to a subset of the range of possible input values.

Clearly, the dimmer can also store different profiles or profile sets for different lamp types. The dimmer can be "told" which type of lamp is attached by a switch selection. Or it can be told over its digital input from the console, for example, by a lighting database program.

But different filaments, by virtue of their different thermal masses and designs, have different responses to current, and so, by providing the current sense information developed by sensor 451C to processor 400A via A/D converter 453A and register 453R, processor can "stimulate" the connected load and observe its response via current sensor 451C. By comparing its observations with stored data for different lamp types, the processor can determine which lamp type is connected and so choose the appropriate transition ramp profile automatically.

With the presense of a microprocessor and the current sensing feature as well as other status information, the dimmer can make many determinations about the status of both itself and the connected load useful for the controller and user to know. For this purpose, an inexpensive power line carrier chip 157 is provided for low-speed status queries and reports over the AC supply wiring. Other means may be employed.

Preheat is employed to reduce the range of variations in the impedance of the connected filament(s), and with it, in the current demands on the semiconductors. This preheat function can be provided with a time-out to conserve power and/or turned off when serial transmissions to the dimmer cease.

USE OF ASYMMETRIC WAVEFORMS

Controlled transition dimmers impose significant dissipation requirements on the semiconductor power devices they employ. The use of unconventional waveforms to reduce thermal losses was first suggested in the grandparent application, now U.S. Pat. No. 4,633,161. In some cases, the use of asymmetrical waveforms may permit a reduction in device dissipation.

AC dimmers and other power control apparatus with asymmetric waveforms from half-cycle to half-cycle are known. The simplest such dimmer is the skipped half-cycle design, which has the advantage of switching only at the zero-crossing. Unfortunately, it also has the disadvantage of insufficient resolution for professional use, given the relatively low frequency of the AC supply. It is, for example, easy to achieve half-power by skipping alternate half-cycles, but hard to produce 52% power.

The strategy of dropping entire half-cycles may, however, be combined with one of attenuating selected half-cycles as well.

Figure 1E:
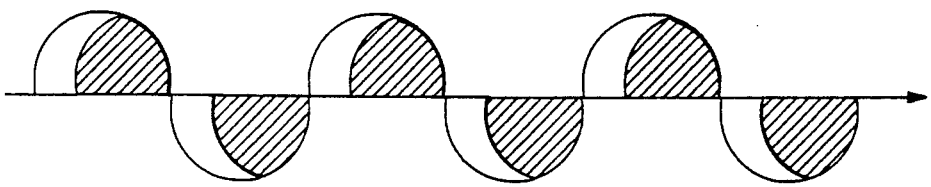
FIG. 1E is an output waveform typical of a conventional phase-control dimmer.
Figure 1F:
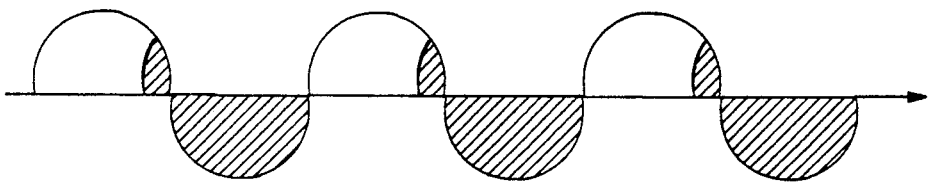
FIG. 1F is an output waveform of a phase-control dimmer with a transition in every other half-cycle.

Refer now to FIG. 1E, that of a conventional "turn-on" phase control dimmer at slightly more than half-power, and to FIG. 1F, the output of a dimmer producing slightly more than half-power by permitting the passage of one entire half-cycle and a small portion of a second one. The result, when averaged out by the thermal mass of the lamp filament, is equivalent to the more conventional output of FIG. 1E, but involves only half the number of transitions, and they are at a lower voltage across the device.

Achieving such operation is relatively simple, processor 400A, for example, can consult a lookup table. The result of the asymmetry of the waveform is a high DC component in the output and the possibility of flickering of lamps with low thermal mass.

Another approach to minimizing voltage across the devices during transitions is to alternate two different phase angles that average out to the desired value.

Figure 1G:
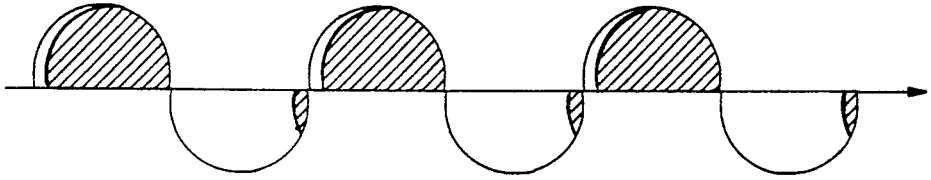
FIG. 1G is an output waveform of a phase-control dimmer producing desired average power by averaging different firing angles in two half-cycles.

The same average voltage produced by the conventional waveform of FIG. 1E could also be produced by alternating between firing very early and very late in the half-cycle, as is shown in FIG. 1G. While there is one transition in each half-cycle, it takes place closer to the zero-crossing than that of either FIGS. 1E or 1F.

Figure 1H:
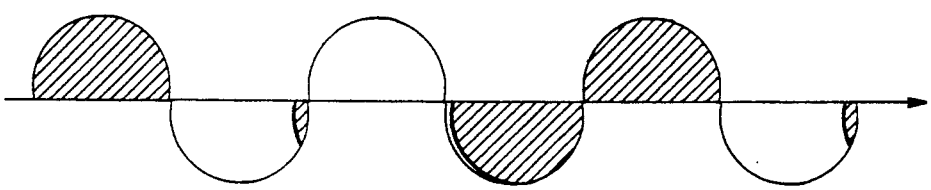
FIG. 1H is an output waveform of a phase-control dimmer producing desired average power by the use of the techniques of the previous Figures.

The two techniques can be combined, as shown in FIG. 1H.

This combined technique would produce the desired average voltage by first, skipping half cycles; second, "fine-tuning" these gross adjustments by incorporating partial half-cycles; and, third, further minimizing the voltage potential across the devices during a transition by substituting pairs of two partial half-cycles with greater and lesser phase angles averaging out to the desired average power.

It would also be possible to use the power device in a linear mode for selected half-cycles.

However, each of the waveforms of FIGS. 1F-1H, by virtue of its asymmetry, possesses a high DC content, which prevents its use with ballasted lamps (such as flourescents) and with fixtures incorporating step-down transformers (i.e. those employing low-voltage bulbs). The asymmetrical current demands of a number of such dimmers may also decrease the efficiency and may overheat a stepdown transformer supplying such dimmers. The effects of the DC component on lamp life, contact arcing, and filament noise are also not clear.

Figure 1I:
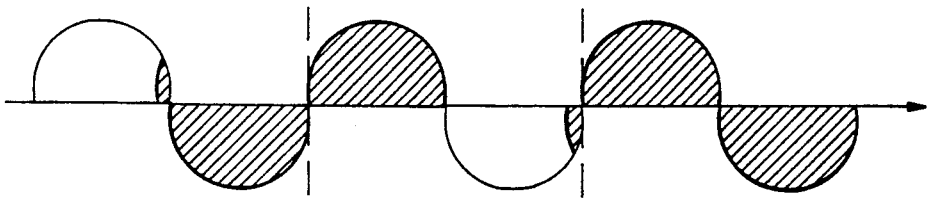
FIG. 1I is a symmetrical output waveform with a transition in every other half-cycle.

Refer now to FIG. 1I, where a dimmer waveform is illustrated having the advantage of the reduced dissipation of FIG. 1F, but providing a symmetrical output. It will be seen that, for example, by inverting the polarity of the output waveform of FIG. 1F with each successive full cycle, that a symmetrical waveform is reestablished, i.e. that half-cycle "a" of FIG. 1I balances half-cycle "d" and that half-cycle "b" balances half-cycle "c".

Figure 1J:
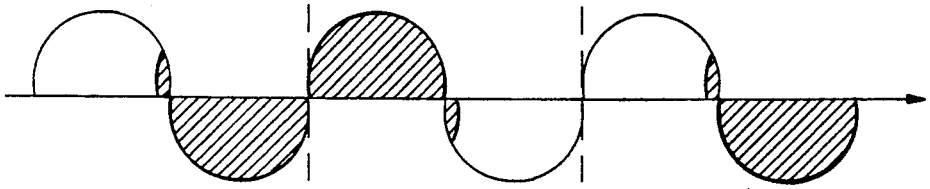
FIG. 1J is another symmetrical waveform with a transition in every other half-cycle.

FIG. 1J illustrates that, with the use of a reverse phase-control "turn off" output, the waveform can be made symmetrical across a zero-crossing, such as that between half-cycles "b" and "c" That is, from a setting of "off", transitions will advance symmetrically from the "b/c" zero-crossing through the "b" and "c" half-cycles. Upon reaching half power, half-cycles "b" and "c" will be on and half-cycles "d" and "e" will be off. Increases above half power will advance the "turn-on" transition through half-cycle "a" and the "turn-off" transition through half-cycle "d" until all four half-cycles are on.

The same technique of adjacent "turn-on" and "turn-off" half-cycles can be used for dimmers varying their output by means of a transition in every half-cycle.

As noted in the grandparent application, now U.S Pat. No. 4,633,161, in some cases, the most efficient reduction in thermal losses may be produced by a dimmer that changes between several different output waveforms, depending upon the desired intensity value.

Such a dimmer can be produced by a simple extension of the Curve Correction function by simply providing a catalog of patterns, indexed to form a range from full conduction to none, and incrementing along that index with a feedback function until the desired voltage for any given control value is achieved Other, hardware, designs producing the various waveforms illustrated will also be readily apparent.

CONSTANT DISSIPATION TRANSITIONS

Prior embodiments have illustrated power stages that stabilize rise (or fall) time despite changes in the connected load. A controlled transition dimmer can also be built that increases rise time with lower wattages and at phase angles where its dissipation "budget" permits In fact, as the limiting factor on rise time is device dissipation, one can sense or predict device dissipation and use a feedback function to maximize rise time within that dissipation "budget". Doing so by sensing device temperature has the added benefit of integrating the effects of the local ambient temperature.

PREHEAT

The decreased impedance presented by a cold lamp filament has long been known to produce current inrushes which may strain the semiconductor power controlling means. Such semiconductors must be oversized relative to their normal operating currents (or conversely, derated) and/or a current-limiting method be provided that limits the current let-through in each half-cycle so that the filament is warmed over a number of half-cycles to the point at which its impedance has risen (and current requirements fallen) to acceptable levels.

Both methods have disadvantages "Over-speccing" or "under-rating" are cost inefficient. The use of current-limiting (or a ramp at the drive stage as disclosed in U.S. Pat. No. 3,898,516) to gradually warm the filament produces a delay in response which may be unacceptable in some applications.

A means may be provided, however, for preheating the lamp for the purpose of increasing the power-handling ability of a given semiconductor by decreasing the difference between off-state and on-state load resistance.

Such preheat circuits have proven to reduce the on/-off state resistance ratio from 10:1 to 4:1.

PHYSICAL EMBODIMENT OF FIGS. 3A AND 3B

Refer now to FIGS. 3A and 3B where a first mechanical package for the disclosed dimmer is illustrated.

The use of a distributed dimmer that is functionally integral with the fixture it controls has long been a desirable object, in part because it presents no incremental increase in handling labor. Ideally, the dimmer would be contained within the fixture yoke, but the volume of a dimmer filtered to professional standards would exceed the clearances available between most production fixtures and their yokes. This would require the substitution of a custom, elongated yoke which is less than desirable for a variety of reasons. More commonly, dimmers of this type have been attached to the exterior of the fixture yoke. In this location, they significantly reduce the maximum number of fixtures which can be employed on many types of lighting position, by increasing the minimum mounting centers. They may reduce the number of fixtures that can be accomodated in some types of shipping crate; may hinder access to the fixture during focusing; and are vulnerable to damage during handling.

Referring to FIGS. 3A and 3B, fixture 301, illustrated as an ellipsoidial reflector spotlight (such as manufactured by Colortran, Inc., Burbank, Calif.), includes a formed metal yoke 303 which allows vertical adjustment about an axis through handwheel 305 and bolt 306. Yoke 303 is, in turn, attached via bolt 311 to the fixture mounting position, here illustrated as via the stud 310 of a standard "C-clamp". Freed of the requirement for a bulky filter inductor the disclosed dimmer may be accomodated within a housing 309, here illustrated as an aluminum casting, designed to conform to the interior surface of yoke 303. Heat sink fins 317 are cast into enclosure 309, with an interior profile that provides adequate clearance for fixture 301 in all orientations High-temperature lead 321 connects the fixture with the dimmer, lead 319 connects the dimmer with power and signal inputs. Additional controls including an address thumbwheel switch 315, signal indicator, neon pilot light, and self-test button are provided. Housing 309 provides a pass-hole for bolt 311, which is inserted through both housing 309 and yoke 303 into the internally-threaded portion of stud 310, mounting fixture and dimmer in the same operation. Alternatively, a U-shaped slot may be provided with a well to accept the bolt head or washer, such that the dimmer can be removed without requiring that the bolt 311 be completely removed. Alternatively, the dimmer enclosure may clip onto the yoke.

The embodiment of FIGS. 3A and 3B thus achieves the long-desired object of mounting a dimmer to its fixture with none of the disadvantages of prior art units. For the first time, professional standards of performance are achieved with no increase in fixture bulk, minimum mounting centers, or shipping volume.

PHYSICAL EMBODIMENT OF FIG. 4A AND 4B

Figure 4B:
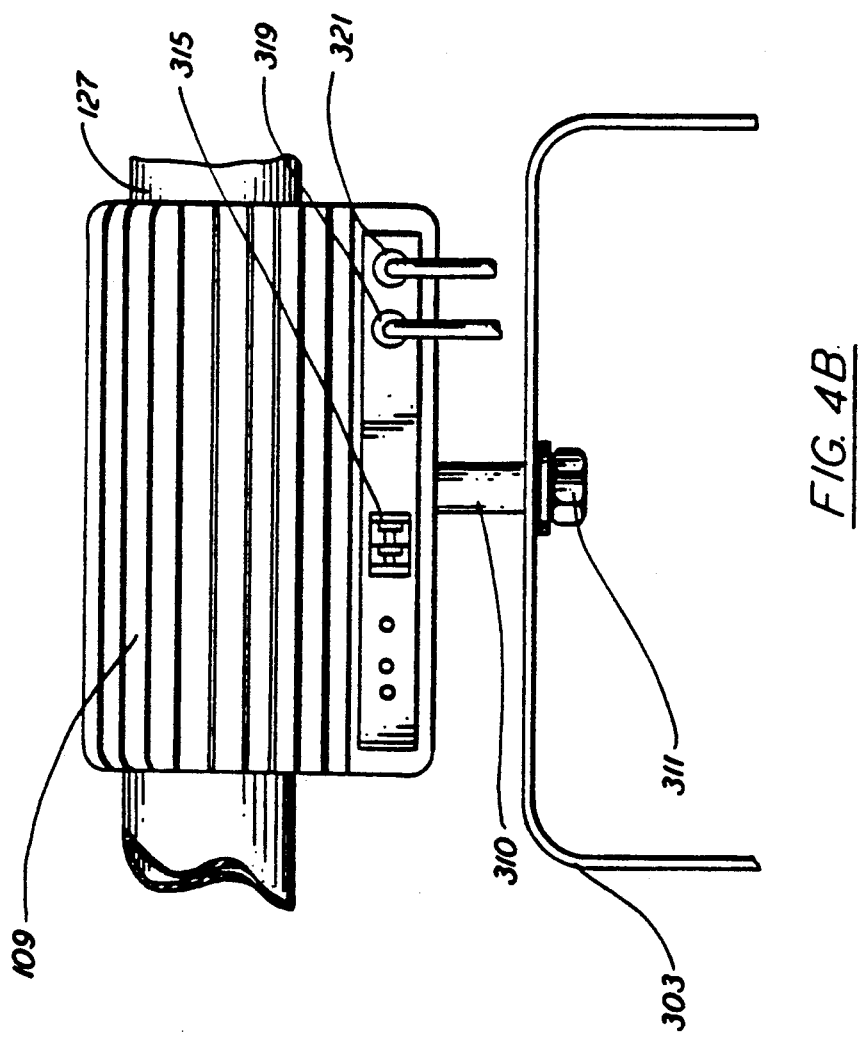
FIG. 4B is a rear elevation of the embodiment of FIG. 4A.
Figure 4A:
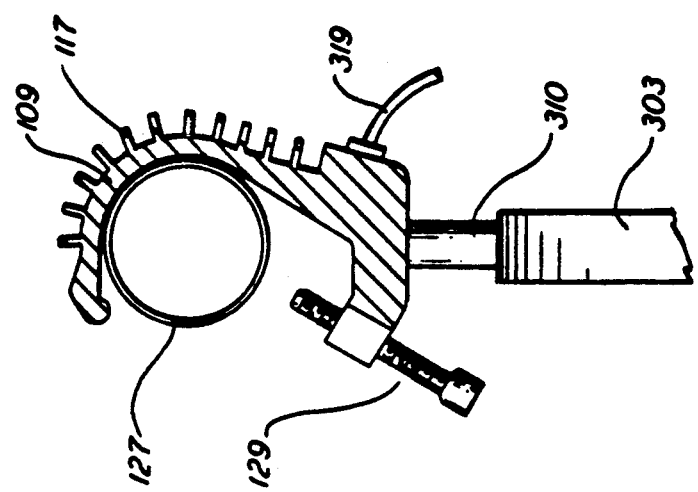
FIG. 4A is a side elevation of an embodiment adapted for use as a lamp-supporting clamp.

FIGS. 4A and 4B illustrate a second mechanical embodiment.

As an alternative to mounting a dimmer on the fixture itself, some prior art distributed dimmer schemes have employed single-dimmer enclosures which attach to the same mounting position as the fixture rather than to the fixture itself. The resulting boxy enclosures compete with the fixtures for location on the pipe or rail and complicate the mounting and movement of fixtures as well as access to them.

FIGS. 4A and 4B illustrate that the disclosed dimmer permits an embodiment uniquely capable of conforming to the mounting position. The dimmer enclosure can be designed as a substantially cylindrically-shaped collar that surrounds the pipe from which fixtures are most commonly hung. Here, the function of the dimmer enclosure has been further combined with that of the clamp that attaches the fixture to the mounting position.

Referring to the Figures, the disclosed dimmer has been installed in a housing 109, here illustrated as fabricated from an aluminum extrusion, which includes the basic profile of a "C-clamp" which grips steel pipe 127 by tightening bolt 129 in the prior art manner. Stud 310 is provided for the attachment of the yoke 303 of any lighting fixture, using bolt 311 as previously described. The external surface of housing 109 is provided with heat sink fins 117, and some additional sinking may result from conduction through pipe 127. High-temperature lead 321 connects the fixture with the dimmer; lead 319 connects the dimmer with power and signal inputs. Additional controls including an address thumbwheel switch 315, signal indicator, neon pilot light, and self-test button are illustrated.

The disclosed dimmer in the embodiment of FIGS. 4A and 4B thus achieves the desirable object of attaching the dimmer to the same mounting position as the fixture with none of the disadvantages of previous methods. Fixture and dimmer are mounted and moved in a common operation, with no undesirable increase in bulk at the position.

IMPROVED POWER AND SIGNAL CONNECTOR

The use of distributed dimmers as illustrated in the previous Figures requires providing both power and signal, whether multiplexed or discrete, by means of portable cables and temporary connections. While separate cables and connectors can be used for each function, in many cases it would be desirable to employ a single connector for both. While multi-pole multi-connectors have been employed to distribute both power and signal in other performance lighting applications, such connectors are difficult to field install and have no commonality with industry standard power connectors.

Refer now to FIGS. 5A–5I, where an improved connector system for simultaneously distributing power and signal is illustrated.

FIGS. 5A and 5B illustrate a 20A 125VAC grounded "pin" connector 201 (such as the model 2P&GMC as manufactured by Union Connector Co., Inc., Roosevelt, N.Y. 11575) which has long been the standard of the industry. The connector 201 provides split brass pins 203 for hot, neutral, and ground. Flexible conductors such as cable 209 enter the connector body via a molded-in strain relief, and the individual conductors are terminated using uninsulated ring crimps.

FIGS. 5C and 5D illustrate a mating panel-mounted receptacle 211 (such as the Model 2P&GF-FL by the same manufacturer). Similar cable-mounted receptacles (such as the model 2P&GFC) are also available.

FIGS. 5E and 5F illustrate an improved connector 221 for both power and signal. The power portion of the connector body duplicates the body of connector 201. However, a well 225 is added to accommodate an insert 227 mounting pins 223 for the low-voltage signal connection. Such pins could be installed captive to the body of connector 221, but preferably a removable insert 225 is employed, and accordingly a retaining barrier 226 is illustrated. The use of a removable insert has the benefit of allowing the use of a stock low voltage connector insert (such as manufactured by Hypertronics Corp., Hudson, Mass. 01749), reducing the cost of developing connector 221 to little more than enlarging the die for the body of connector 201. Further, different termination techniques may be employed for the power and the signal conductors, and the termination operation for the latter performed outside the connector body. While a rectangular insert with three parallel pins is illustrated, it will be understood that it may be desirable to employ a circular "XLR"-type insert (such as manufactured by ITT Cannon Electric, Santa Ana, Calif. 92702).

The body of connector 221 is provided with dual strain reliefs to allow the use of separate power and signal cables 228 and 229 or a common cable for both functions.

FIGS. 5G and 5H illustrate a mating panel-mounted receptacle 231 (and, by extension, a cable-mounted receptacle). A protruding enclosure 235 for the signal insert 237 is cast into the receptacle body. It will be apparent that one benefit of this arrangement is that the smaller male signal pins 223 can be shrouded by the body of connector 221 for protection from damage in handling. It will also be apparent that any improved connector 221 can be mated with a conventional receptacle 211, and that any conventional connector 201 can be mated with an improved receptacle 231. Thus, any cable constructed with the improved connector remains completely "downward-compatable" with conventional dimming equipment, vastly simplifying the user's inventory.

Alternatively, a combined signal and power connector body can be produced by attaching (either temporarily or permanently) a housing 241 for the signal insert 227 to a power connector body 201, here illustrated as by means of dovetail joints 219 and 249 cast into the finger grips. Similarly, the plug or receptacle may incorporate an adaptor to an RJ-11 or similar modular jack, allowing a transition to prefabricated signal cables.

Multi-phase versions of the connector can also be readily produced.

It will be apparent that the disclosed connectors with suitable cabling provide a common, integrated means of supplying both power and control not only to distributed dimmers, but also to motorized and automated fixtures and accessories, again, in a manner compatible with prior art cables and connectors.

PHYSICAL EMBODIMENTS OF FIGS. 6A–6M

A third mechanical embodiment is illustrated in FIGS. 6A, 6B, and 6C.

As previously described, a practical distributed dimming system would offer important practical advantages in permanent installations No elaborate system of carefully identified conductor pairs would be required between the fixture positions and distant dimmer racks, nor need spaces be set aside for the latter which must be ventilated and sound-isolated. Instead, the use of a fully distributed dimming scheme would permit the installer to connect the receptacles on the connector strips with conventional circuit breaker panels, located in proximity to the supplied circuits in a manner calculated to maximize both convenience and economy. In the case of outlet boxes, the required branch circuit distribution breakers could be made integral with the dimmer enclosure, such that only power feeders and a signal conductor need be supplied to the unit. Alternatively, particularly where access to the fixture position is limited, the dimmer enclosures can be mounted at a nearby location, such as, for example, above the catwalk or in a vertical array on the studio or auditorium wall. The thermal load presented by the dimmers in any of these embodiments would be distributed throughout the performance area, hence no special cooling or ventilating provisions would be required.

In the case of connector strips, a prior art fully distributed scheme has been proposed in the form of connector strip in whose elongated metal enclosure thyristor dimmers are installed. Such a scheme has many disadvantages. The use of the connector strip as the mounting enclosure may result in an undesirable internal heat rise caused by the thyristors, and particularly by the choke—one which is aggravated by the lack of internal ventilation and the elevated ambient air temperature produced by nearby fixtures. The bulk of the choke reduces the crosssectional area of the enclosure available for wiring. The internal mounting of the dimmer components also makes service very difficult given the dimmer location.

Refer now to FIGS. 6A–6C, where a third mechanical embodiment is illustrated.

Elongated raceway enclosure 641 mounts a plurality of receptacles, spaced as desired. Unlike conventional prior art connector strips, receptacles are provided for both power and signal. Separate receptacles may be provided for each function, but a common receptacle (here illustrated as receptacle 231 of FIGS. 5G and 5H) may be employed.

While improved dimmer of the present invention could be installed in the raceway enclosure 641, it has been illustrated as installed in a housing 609, here illustrated as an aluminum casting, which is independent of raceway enclosure 641. Housing 609 has been provided with an inlet connector 621, illustrated as a panel-mounted version of connector 221 (as illustrated in FIGS. 5E and 5F), which supplies power and signal from receptacle 231. An outlet receptacle 211 (as illustrated in FIGS. 5C and 5D) is provided for the lamp. Address selector switch 315 and additional indicators and a self-test switch are provided adjacent to connector 211. Housing 609 has been illustrated with cast heat-sink fins 617.

Alternatively, the outlet receptacle 211 for the fixture may be mounted to the raceway enclosure 641, and the dimmer provided with an inlet connector 621 with two "hot" poles, one for supply and one to return the dimmer output to the raceway enclosure 641 for connection to lamp receptacle 211. It will further be understood that separate, parallel raceway enclosures may be provided for power and signal, or alternatively, that an internal partition may be installed in raceway enclosure 641 to separate the two conductor types. It will also be understood that continuous busses may be employed for power and/or signal conductors, and that in some embodiments, the dimmer enclosure may be provided with an inlet connector which attaches directly to the busses. It will further be understood that control signals signal may be distributed in parallel rather than serial form, and that in serial embodiments, the dimmer address may be predetermined by the receptacle itself.

Many designs for housing 609 are possible, and should not be understood as limited except by the claims. It is here illustrated as having a profile, visible in FIG. 6C, including a recessed portion having a shape complementary to that of raceway enclosure 641, such that when connector 621 is mated with receptacle 231, the dimmer produces only a modest increase in the bulk of raceway enclosure 641. This arrangement has the added benefit of assisting in aligning connector 621 with receptacle 231 during mating, and of protecting both connectors from damage caused by shear forces should the dimmer enclosure be struck an accidental blow.

As will be seen, such a system can be designed with the module plugging into the top of the raceway, with the advantage that gravity keeps the module in place and no locking means is required.

A module can plug into the raceway from the side as well, although the top and bottom mounts offer two large vertical surfaces for heat-sinking.

One approach to retaining the bottom mount would include a magnet attached to the module that is attracted to the raceway or a plate or second magnet on it. Another approach is a latch or spring on the module that snaps into a groove extruded in the raceway or over its top edge.

In any of these embodiments, a locking mechanism may be provided that prevents unauthorized removal of a module from the raceway, and electronic an access code that must be transmitted at each power-up is also possible.

The embodiment illustrated in FIGS. 6D and 6E uses a captive pigtail such as 205B attached directly to the raceway 641 in the prior art manner. As previously described, a receptacle 232 is provided on the raceway into which a dimmer module can be plugged, placing it in series between the AC supply and the load connector 206A or 206B.

Such an approach has certain advantages, but requires some connection across the receptacle 232 to energize the pigtail 206A, for example, as a hot-patch.

Such a connection could be provided by a switch, but that has the disadvantage of increasing the per pigtail cost of the raceway and introducing a potential source of failure.

A shorting plug is a simpler alternative to a switch, but represents a loose component.

Figure 5J:
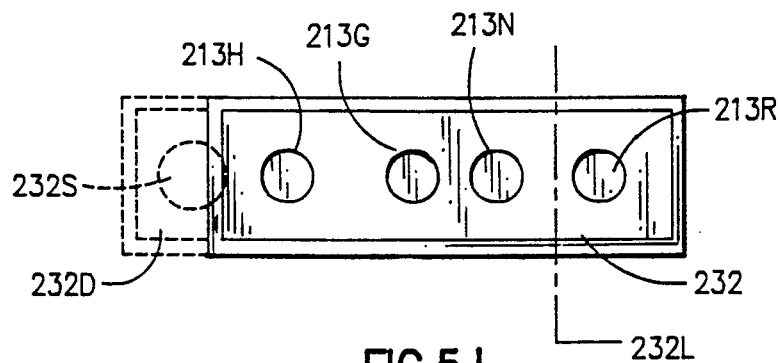
FIG. 5J is a front view of an improved power and signal receptacle.

Refer now to FIG. 5J. Connector 232 is based upon the known Harj-Lok flush mounted receptacle as previously described—indeed it can be produced by enlarging the die for that connector. That portion of the revised connector 232 to the left of line 232L is the same as the present Harj-Lok, including a hot contact 213H, ground contact 213G, and neutral contact 213N. The receptacle 232 is, however, enlarged to include provisions to the right of line 232L for a fourth "return" contact 213R.

When connector 232 is inserted in raceway 641, the hot, neutral, and ground conductor from the AC supply are coupled to contacts 213H, 213G, and 213N. Contacts 213G and 213N are also parallelled with the appropriate conductors of the pigtail 205. The hot conductor of pigtail 205 is connected with contact 213R of receptacle 232.

Dimmer module 609 includes four male pins 622 that supply hot, neutral, and ground to the dimmer and return its output to the load via the pigtail. By employing for connector 232 the same contacts and contact spacings for hot, neutral, and ground as the standard Harj-Lok receptacle, however, the user can gain a "hot pocket" without the need for a shorting plug by plugging a cable with a standard pin connector male directly into receptacle 232. The spacing of contact 213R relative to 213N assures that the male connector cannot be misplugged into the wrong set of contacts.

Receptacle 232 can be further enlarged to include a well 232S for a signal connector and/or LED as indicated by dashed outline 232D.

FIGS. 6D and 6E illustrate one possible physical embodiment of the dimmer module, which is shown as assembled from two identical casings split along the plane 609L. When assembled, the castings captivate the illustrated circuit card and connector in the lower chamber created by them as well as the connector 622. The design of the castings provides heat sinks with pin fins 617P on both the inner and outer surfaces of each side panel. The pin fins on the interior surface of the side panels, combined with openings at the bottom, allow the vertical passage of air between the sides of raceway 641 and the side panel casting of the dimmer module, increasing the useable heat sink area. The fins or pins on the interior of the side panels also space the panel itself away from the raceway, allowing clearance for the mounting of devices on the side panel itself (rather than below it as is illustrated).

Refer now to FIG. 6F-6M, where such a mechanical embodiment is illustrated in further detail.

Figure 6I:
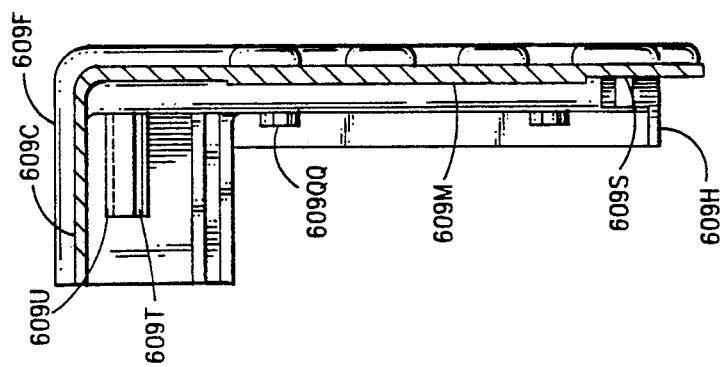
FIG. 6I is a section through FIG. 6G.

Like the mechanical embodiment of FIG. 6D and 6E, the embodiment of FIG. 6F-6M is designed as two symmetrical half sections joined along a central plane. Unlike the embodiments of the previous Figures, the instant embodiment, as shown in FIG. 6M, is designed to sit atop the raceway, with the advantage of requiring no mechanical means to retain it in place. It employs an inlet connector 622 plugging into a receptacle atop raceway 641F, and provides a pigtail 205C, which may be of any required length and may be terminated with any connector desired.

Referring to the various FIGS. 6F–6M, it will be seen that the enclosure consists of two identical castings 609C and 609CC. The design of this casting, in the illustrated embodiment, may provide a chamber in the upper portion (as shown in FIG. 6K, a section) for the electronics, which may be mounted on a printed circuit card retained in slot 609T. Openings 609N are provided for LEDs indicating status, including the presense of input power and signal, output power, and current-limiting, as well as pushbuttons for self-test and current-limit reset.

The male power inlet connector 622 may comprise male pins mounted to an electrically-insulating plate retained in slot 622S. Male bosses 609U and 609v of one casting interlock with spaces 609UU and 609VV of a second to assemble a complete housing, which may be held closed by bolts passing through holes 609G and 609H.

The lower portion of casting 609C provides a large "ear" that has several functions.

One function is to provide a mounting surface 609M for one or more semiconductor power devices, along with a heat-spreading area and heat sink fins 609F for dissipation. The profile of this portion, illustrated in FIG. 6L, is of a gull-wing shape, providing clearance for the semiconductor package or packages, which may be held in place by bolts through holes 609R.

Figure 6G:
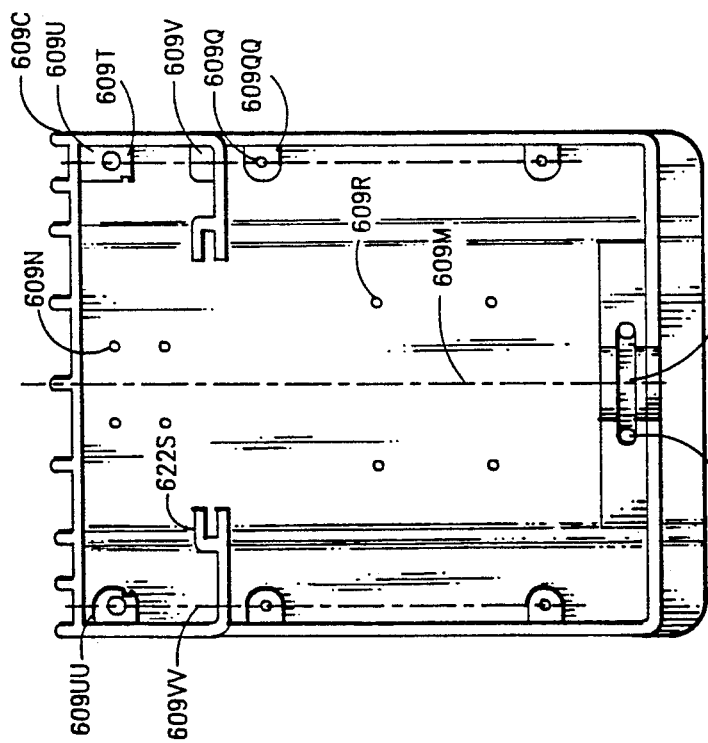
FIG. 6G is reverse elevation of the interior of one side casting of the embodiment of FIG. 6D.
Figure 6H:
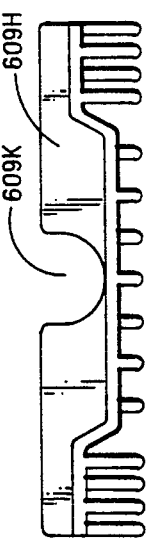
FIG. 6H is a reverse plan view of FIG. 6F.

A second function is to provide for power pigtail 205C, and for the conductors connecting it with the power devices and inlet connector 622. Accordingly, FIG. 6G–6I illustrate a U-shaped recess 609K that serves as the "backrest" of a cable clamp, similar to that of the well-known "2-screw" or "Romex" connector. Holes 609S are allowed for passage of bolts engaging the tapped holes in the floating portion of the cable clamp. Recess 609K is used for the power pigtail on only one of the two castings that make up an enclosure, and the second such recess can be used for a Cannon "XLR" or Switchcraft "D" receptacle fastened to bulkhead 609H. The function of such a receptacle will be described below.

The illustrated casting also provides standoff bosses 609QQ with bolts holes 609Q for a printed circuit card and/or insulator covering the area bounded by the lower bulkhead 909H and the electronics chamber.

Preferably, in volume applications of this and other mechanical embodiments, a cast or extruded heat sink will be used in combination with FET die bonded to it (via an appropriate substrate, for example, a solder-/moly drain pad and a BeO insulator) to obviate the need for a separate package for each device. One method is to use a composite circuit card such as the Thermal-Clad manufactured by Bergquist Co., Minneapolis, Minn. 55435 as the die mounting surface, electrical interconnect, and heat-spreader, with additional fins or pins bonded to the back of the baseplate layer.

It will also be seen that it may desirable to isolate the active electronics from the heat produced by the power devices. While ventilation of the electronics chamber is possible, another approach is to locate the electronics in a thermally-isolated section of the case. For example, a three-piece enclosure can be fabricated that consists of aluminum or other thermally-conductive side panels (like those illustrated) mounting the power devices. The two may be separated by a spacer section fabricated of a thermally insulating or transparent material (such as a thermoset, thermoplastic, or ceramic) or a metal section simply mounted to the side panels by means of thermal insulators. This spacer section may contain the electronics and male inlet connector. The use of a material that is also an electrical insulator permits mounting the pins of the male inlet connector directly to the spacer section.

A related approach would employ an enclosure with side panels of different sizes; one, wide side panel would provide heat sinks for all power devices, and the other, much more narrow, would house the electronics. The two would be separated by a thermal barrier as described, or the spacer/male inlet section and electronics section could be fabricated as a single casting of thermally-insulating or transparent material. Such an arrangement would have the benefit of separating the electronics from the heat produced by the power devices with the raceway, as well as placing virtually all the power wiring on a single assembly.

The mechanical embodiment of disclosed dimmer illustrated in FIG. 6A–6M offers a number of unique advantages. The unit can provide EMI and audible lamp noise suppression meeting or exceeding the highest current professional standards yet is totally silent under all loads and at all phase angles. The thermal design of the raceway enclosure 609 is also simplified.

Because the dimmer is mounted in an external, detachable enclosure, there is no significant reduction in the crosssectional area of the raceway enclosure 641, and hence in the space available for power and signal conductors 643, nor are such conductors exposed to the increase in temperature produced by mounting dimmer components within the raceway enclosure 641 itself.

Further, service is simplified, as a failed dimmer is simply unplugged and replaced with a spare. However, unlike dimmers employing bulky chokes, the profile of the dimmer can be minimized, and with it, the increase in total connector strip/dimmer profile.

The illustrated embodiment has an additional important advantage.

The prior art distributed dimmer scheme described, whose dimmers are mounted permanently internal to the raceway, if installed in a facility, would offer the savings in installation costs previously described. However, it requires the installation of a dimmer for every outlet, which is hardly ideal in installations, like television studios, which may use only a fraction of their outlets at any one time.

The embodiment of FIG. 6A–6M offers a uniquely flexible alternative. Those installations which use a high proportion of their outlets can plug a dimmer enclosure into each one. Those installations with lower utilization can maintain an inventory of dimmers slightly larger than their fixture inventory, and employ them on an as-needed basis. Indeed, both strategies can be used within a single installation, with a "dimmer-per-outlet" approach at some positions, and "dimmer-per-fixture" at others.

Further, as illustrated by connector 231 in FIG. 6A, the use of standardized power and signal connectors for the dimmer enclosure 609 allows plugging "dimmer-on-lamp" units (as illustrated in FIG. 3A–4B) into the connector strip as well.

It will also be appreciated that the same outlets can be used to provide AC power directly to equipment like ballasted gas-discharge sources that do not need—or should not be connected to—dimmers, as well as both power and signal to motorized or automated fixtures or devices that incorporate their own mechanical or electronic dimming means.

Finally, in the case of fixtures dimmed by any of the disclosed embodiments, a receptacle can be provided for control signals and/or line- or low-voltage power required by the accessory used by the dimmed fixture, most commonly a color changer. As previously noted, such accessories require a constant source of power as well as their own control signals, which prior art centralized dimming and distribution systems have not provided. The disclosed dimmer enclosures can be provided with one or more receptacles providing means for supplying either line- or low-voltage power to the accessory and control signals, by means of a jumper between the receptacle and accessory. Such a jumper 205D is illustrated in FIG. 6M, with its connector 206D plugged into a receptacle mounted at recess 609K of casting 609CC. By integrating the low-voltage power supply in the dimmer enclosure, the size, weight, and cost of the accessory can be reduced. Further, the dimmer can decode not only its own control signal from the serial data stream, but a separate control signal for the accessory, at a minimal incremental increase in cost. Ideally, the same serial address can be used for both the dimmer and its accessory with a different serial start code.

It will also be apparent that other types of dimmer power stage, including inductively-filtered thyristor-based designs, could be used, less desirably.

CONTROL SIGNAL DISTRIBUTION

Supplying desired intensity values to the dimmers requires a method of reliably distributing the data to the various dimmer locations There is also the issue of how the dimmers (or other users) determine their serial addresses. Because dimmers are readily removeable and interchangeable, while address switches could be provided on them, this would require that the user match the address switch settings to the outlet number every time a dimmer is installed or moved (if the user wishes the dimmer address to be the same as the outlet). As users cannot be counted upon to do so, errors and the resulting confusion can be produced.

In some applications (and in dimmer-on-lamp embodiments), a fixed address for each dimmer may be desirable, such that when the dimmer is moved to another outlet it still retains the same address In these and other applications, it may h=desirable to permit the user to remotely change the nominal address of a dimmer—or to add or substitute another value. Such other value could constitute the channel number, such that a "distributed signal patch" scheme results in which the data supplied to the dimmers represents the desired channel values rather than discrete dimmer values.

In those embodiments in which the dimmer is provided with its own address, a means for indicating that address from a distance, such as LED displays or a large LCD or similar display.

In other applications, ideally, the address of the dimmer is automatically set to that of the outlet when the dimmer is plugged into it.

One method of doing so is to provide a means at each outlet uniquely identifying the outlet address, one which cooperates with a detecting means on the dimmer module. For example: an additional miniature connector wired with the binary-coded address; a bar code label sensed by photodetectors on the module; a binary-coded row of cams that selectively actuate a DIP switch on the module.

All of these methods have some tradeoffs in cost, complexity, and reliability.

Figure 2C:
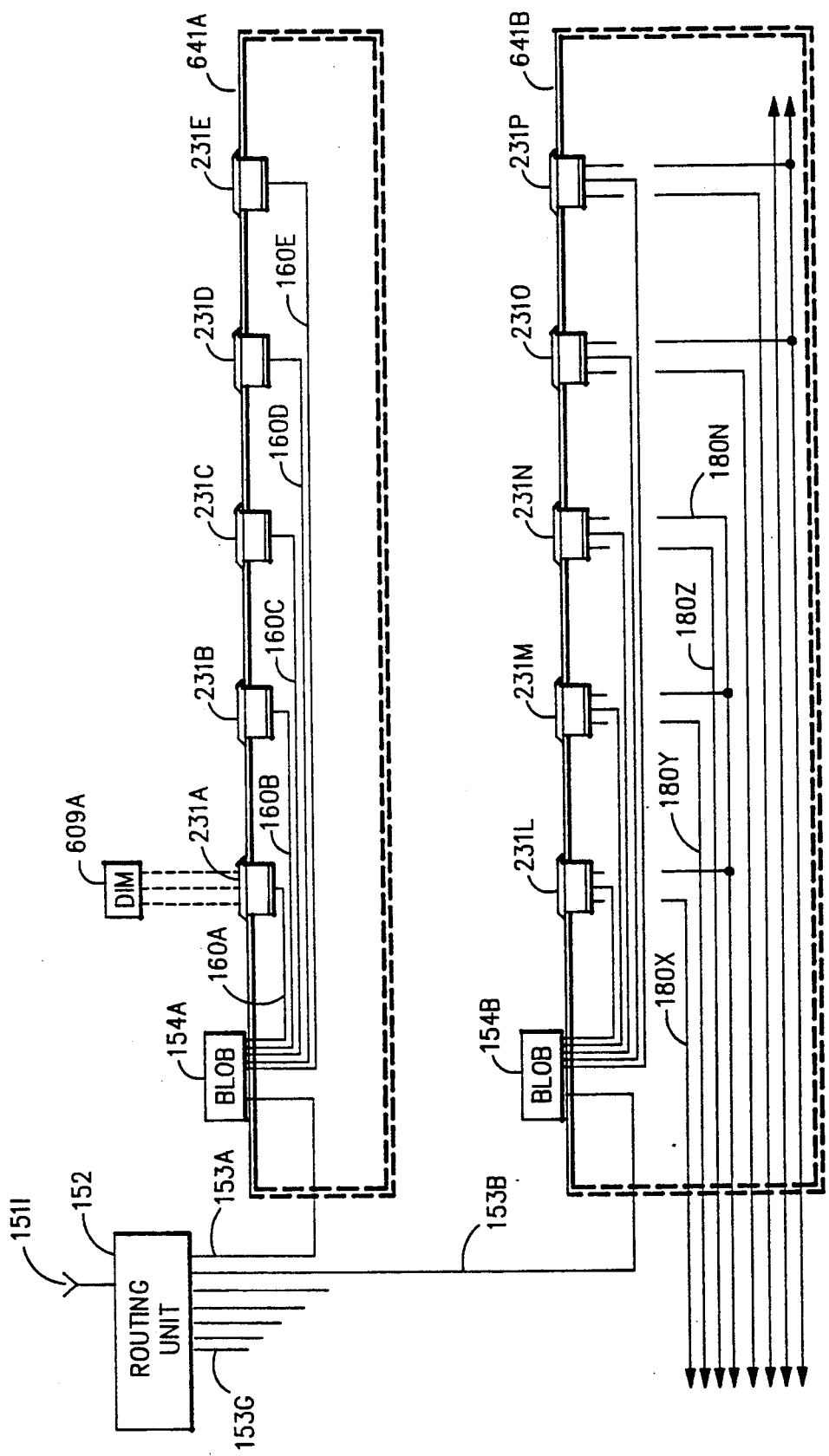
FIG. 2C is a block diagram of one embodiment of a control signal distribution system.

FIG. 2C illustrates a signal distribution scheme that addresses these issues.

Each raceway section (e.g. section 641A and section 641B) mounts standard pin connector (or other) receptacles 231A–231P. These are wired directly to supply circuit breaker panels.

Adjacent to or inset in each of receptacles 231A–231P is an LED, aligned with a photodetector 160I in the dimmer module 609A. Desired intensity values and other data are coupled between the raceway and the dimmer module by this means, which is simple, rugged, and reliable It provides the voltage isolation required to float all of the dimmer electronics at line voltage, and protects all other dimmers and the console from electrical faults The LED of each such receptacle is connected to a raceway "blob" module 154A. Each raceway "blob" is connected to one output of a routing unit 152 via a twisted pair cable carrying both RS-422 (or 20 mA current-loop) data and power supply for the "blob" electronics. A single such cable can be "daisy-chained" among multiple "blobs", or a discrete cable run be provided between each "blob" and the routing unit 152 (as is illustrated) for greater fault-isolation.

The routing unit 152 accepts a standard DMX-512 serial input. In a known manner, its hardware consults a lookup table that contains the lowest dimmer number addressed by the raceway "blob" on each of its outputs 153A–153G. Each of these outlets will remain quiet until the incoming DMX-512 packet reaches the level for the first dimmer number on the raceway section whose "blob" is coupled to that outlet. The routing unit then passes on only those levels for outlets on that raceway section and then reroutes the transmission to the next raceway section.

The first byte that raceway "blob" 154A will see from the routing unit on 153A will be the desired intensity byte for the dimmer plugged into outlet 231A. The raceway "blob" will automatically switch each successive intensity byte to the next outlet/LED.

Thus, the dimmer plugged into an outlet sees only the intensity byte for that outlet and no address decoding function is required at the dimmer.

The components at each raceway receptacle are limited to one LED, which is wired back to a simple, plug-in "blob".

One multi-pair cable connects a raceway with the centralized routing unit. There is no high-speed multi-drop serial communications and a high degree of fault and electrical isolation is possible.

The routing unit can also suppress transmissions to the modules to turn off preheat when the console is active (producing DMX out) but no dimmer has received a level for some defined period.

Variations employing fewer conductors are also possible.

One method is to matrix the light-emitting diodes at the raceway outlets. For example, one side of each LED is connected to one of eight driver lines #1-8 and the other to one of eight return lines #9-16. Each such LED is connected across a unique pair of such lines.

While such an arrangement can be used to drive a single LED at a time, throughput can be increased or the data rate decreased if the distribution "blob" drives all LEDs on the same return line at the same time. For example, the first bit is loaded into drivers #1-8 for the LEDs on return line #9, which is then be enabled to simultaneously light all those LEDs on the return line having data "1". This process is repeated through all the data bits for those dimmers/outlets on return line #9, and then advance to those LEDs on return line #10.

This approach effectively decreases the baud rate between the input and output side of the "blob" by a factor of eight, which may have advantages in terms of the response time of relatively inexpensive cable used to connect the blob with the LEDs, as well as the response time of less expensive LEDs and photodetectors The technique of driving multiple LEDs simultaneously can also be employed with the "discrete pair per LED" approach, but the "matrix" approach reduces the number of signal conductors in the raceway itself, provided that the driver and return lines are run through the raceway and the LEDs are tapped into them at or near their outlets. This can be accomplished with known insulation-displacement tap connectors such as the Scotchlok Brand "UB" connector by the TelComm Products Division of 3M Corporation.

The "matrixed" approach to wiring has several tradeoffs. Installing the taps (by whatever means) requires access to (and produces service points) across the length of the raceway. Failure of one driver or return line will affect a number of outlets/dimmers and may do so (particularly if intermittent) while producing symptoms that may be difficult for an end user to interpret correctly. Such conductors extending long distances parallel to the line voltage conductors of the raceway might be subject to EMI. Shielding such signal conductors is made more difficult by the requirement for regular taps. Providing a separate compartment in the raceway for shielding the low-voltage wiring increases the cost and complexity of raceway construction and presents the problem of routing the tap pigtails for the LED through the line-voltage section on the way to the LED mount on or near the power connector. The taps may also increase the cross-sectional area requirements of such a compartment, which decreases the useable cross-sectional area in the line voltage portion of the raceway, reducing the maximum number of line voltage circuits for a given overall raceway envelope under electrical code percentage "fill" restrictions.

Despite these potential tradeoffs, the use of such approaches will be suitable for many applications. The electrical isolation by any known means of driver lines from the connection between the raceway "blob" and the routing unit permits the presense of both power wiring and the driver lines in the same compartment, without the requirement for a divider or partition to satisfy electrical code requirements. Shielding can be made integral with the driver lines or provided by foil or similar tape over them, which may also serve to dress and protect them. Flexible printed circuit material may be used in lieu of discrete conductors.

A generally similar scheme can be used to distribute the undivided serial data stream to each outlet for dimmers and other users with individual address decoders.

In any of the embodiments disclosed herein, dimmers or other users can be adapted to recognize either discrete values in a serial data stream on the basis of a local address decoder; a supplementary or temporary value; a "presorted" value; a value for a connected accessory; or an "all users" transmission by the use of different start codes to the serial data stream.

It will further be understood that, either in the context of individually-driven or matrixed LEDs, that the "blob" and/or the routing unit, can serve to convert from higher to lower baud rates, and/or to alter the manner in which the desired intensity or other value is expressed. For example, the "blob" can accept a serial digital input, and convert the information to either pulse-width or frequency-modulated form. This can permit a marked reduction in the complexity of the receiving circuitry required in the dimmer. Further, the routing unit and/or "blob" can selectively distribute non-dimmer information to outlets identified as coupled to, for example, motorized fixtures instead of just dimmers, and further permits the distribution of unequal quantities of data to different outlets/addresses in the same system, based on the needs of each connected device.

SIGNAL DISTRIBUTION BY RADIANT ENERGY

Another means of serial data transmission a raceway system would place one or more high-powered emitters such as LEDs or laser diodes so as to direct their output into the interior to the raceway. The emitter would then pump serial data in visible or IR light form into the interior volume of the raceway, where reflection from its surfaces and/or diffusion or light pipe elements fills the interior volume of the raceway with this data, such that dimmer enclosures 609 (or any other "user") can sense it by inserting a photodetector or optical extension of it in or through a window or hole in the raceway into its interior volume. Materials for the construction of dedicated light guides (such as Scotch brand Optical Lighting Film by 3M Corporation) are also available.

In some applications, desired intensity values encoded as infrared light can be broadcast through free air, or similar wireless means employed.

Another approach is the use of a "fiber optic bus" such as manufactured by Ensign-Bickford Optics Company (Avon, Conn. 06001). This consists of a main fiber optic cable to which "taps" have been attached by creating an aperture in the fiber cladding through which a small quantity of light can escape, and by fixing a tap fiber (generally using a transparent epoxy) so as to collect the light escaping through that opening. "Trunk" or main fibers with 60 or more taps have been fabricated. The main fiber is driven by a suitable LED transmitter and a photodetector can be coupled to the free end of each such tap.

Such a "fiber optic bus", installed within the raceway and providing a tap for every outlet, can distribute data to the outlets at a data rate far exceeding the requirements of the application. The arrangement is functionally inert, immune to the effects of EMI, requires no separate compartment or shielding, and, if properly fabricated, offers essentially unlimited life.

A single fiber provides a single bus with no provision for selectively-addressing each outlet/dimmer. Therefore the user would have to manually enter the address on each dimmer/interface module—or a separate means of automatically addressing the dimmer or interface module would be required. Examples of such means include the use of the previously described retro-reflective photosensor array reading a binary-coded bar code label on the outlet or raceway; or miniature bar magnets inset in the outlet housing activating Hall Effect sensors in the dimmer or interface module.

An alternative is to use multiple fiber optic busses with a modified addressing scheme. In one example, six main fibers are provided, each with its own LED driver.

Each raceway outlet provides for two tap fibers and each dimmer/interface module has two photodetectors, one aligned with each tap fiber.

Taps are installed along, for example, six main fibers to produce a pair of taps at each of 30 outlet locations. These pairs might be: 1/2, 1/3, 1/4, 1/5, 1/6, 2/1, 2/3, 2/4, 2/5, 2/6, 3/1, 3/2, 3/4, 3/5, 3/6, 4/1, 4/2, 4/3, 4/5, 4/6, 5/1, 5/2, 5/3, 5/4, 5/6, 6/1, 6/2, 6/3, 6/4, and 6/5. (Each combination/pair of main fiber numbers is repeated twice, once with that pair in each possible left/-right relationship.)

The two photodetectors in the dimmer or interface module are coupled to logic such that, for example, the left tap is treated as the "enable" input. When that tap is energized "steady on", the module will accept any data on its right tap as data addressed to it. In the manner generally described earlier, the raceway "blob" energizes the driver for main fiber #1 and then transmits the data for the first five addresses using drivers/cables #2-6. It then proceeds to sequentially "enable" fibers #2-6 and repeat the process with the other five fibers for each "enabled" one.

Alternatively, the system can omit the "enable" function and simply Exclusive-AND the output of the two photodetectors such that a dimmer/module will only accept data sent on both of the lines to which it has been tapped. This, however, reduces both the number of outlets that can be addressed by a given number of main cables, and makes it impractical to address multiple outlets simultaneously. While the Exclusive-OR approach permits transmitting to all addresses simultaneously by simply sending on all lines, a similar function can be produced on the modified system by sending a number of messages equal to the number of lines (and not outlets).

The number of main fibers can be increased or decreased depending upon the number of outlets to be addressed. The tap system can also be used in reverse such that multiple nodes can drive a common main fiber. This might take the form of a single main fiber with taps for each outlet.

The disclosed selective addressing scheme can also be used with a wired distribution scheme.

The LEDs or fiber optic taps used by any of these schemes can be inset directly into the power connector as a method of reducing the fabrication cost of the raceway and of assuring physical registration of the emitter and detector.

Figure 5K:
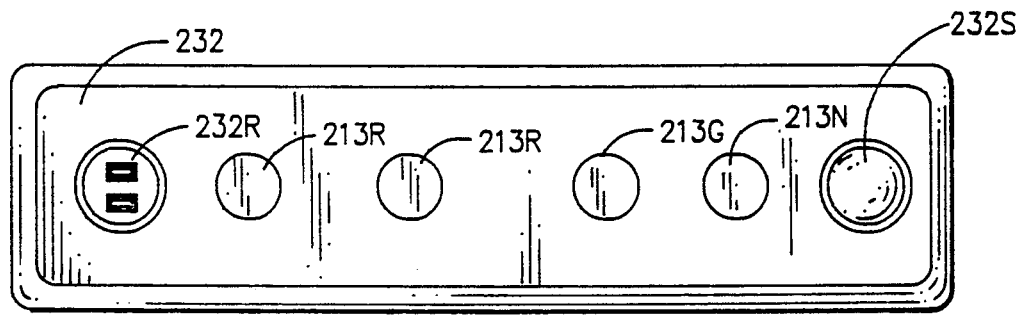
FIG. 5K is a front view of an improved power and signal connector.
Figure 5L:
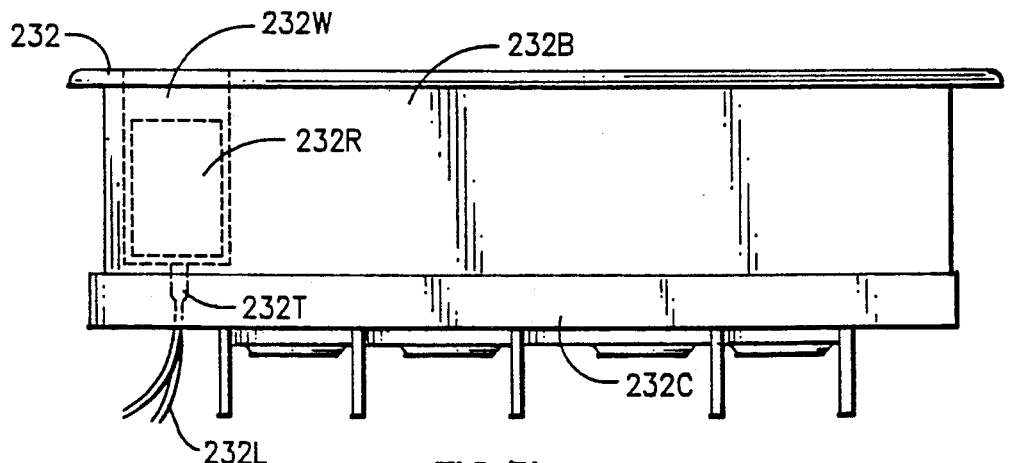
FIG. 5L is a side elevation of the connector of FIG. 5K.

Refer now to FIGS. 5K and 5J. A combined power and signal connector 232 has been produced by enlarging the die for a standard "pop-in" pin connector receptacle such as the previously-described Harj-Lok receptacle made by Union Pin Connector Company, Inc..

The enlarged connector provides not only contacts 213H for "hot", 213N for neutral, and 213G for ground, but a fourth contact 213R that permits the plug-in dimmer module to return its output to the raceway for supply to a pigtail or receptacle mounted on the raceway rather than on the dimmer module itself, as has been previously described. The enlarged connector also provides two wells for the insertion of suitable light-emitting diodes. A standard solderless LED connector 232R such as the Conxriter unit by Visual Communications Company, Inc. (San Diego, Calif. 92126) (which also incorporates an internal resistor) may be inserted in each of two wells 232W provided in the connector body 232B. The LED connector 232R has contacts to which wire leads 232L can be soldered. These contacts can also accept known quick-connect terminals 232T, which are plugged in place. A reduction in the size of the pass hole through the bottom cap 232C of the connector 232C prevents strain on the flying leads 232L from unplugging terminals 232T from the contacts of LED connector 232R.

A suitable visible or IR LED is plugged into each of the LED receptacles. An LED 232S is shown plugged into the LED receptacle adjacent power contact 213N.

The two LEDs in each dimmer receptacle 232 therefore result in four flying leads, and such LEDs may be wired in any of the previously described methods.

It will be understood that in cases where the power connector is mounted atop the raceway, that an LED or fiber optic port may be mounted on the side of the raceway to prevent the natural accumulation of dust from attenuating output.

It will further be understood that other contact and non-contact methods (for example, inductive coupling) may be used to couple control information between the raceway and the dimmer or other user.

It will be understood that, in addition to dimmer enclosures such as illustrated in FIG. 6A-6M, that the use of non-contact coupling of the control signal may employ an adaptor, plugging into the raceway, and serving the function of converting the encoded control signal into an electrical signal that can be coupled via a suitable connector and cable (or amplified to drive a fiber-optic link) to a remotely located fixture.

While the various schemes for distributing control information are described in the context of a raceway system employing the distributed dimmer disclosed, it will be apparent that the above techniques can be applied individually or in combination to other distributable packages and to dimmer racks and dimmers of conventional construction. Physical Embodiment of FIG. 7A and 7B In some cases, an elongated raceway or portable enclosure may not be practical, such as at some exposed locations in the auditorium itself.

Figure 7B:
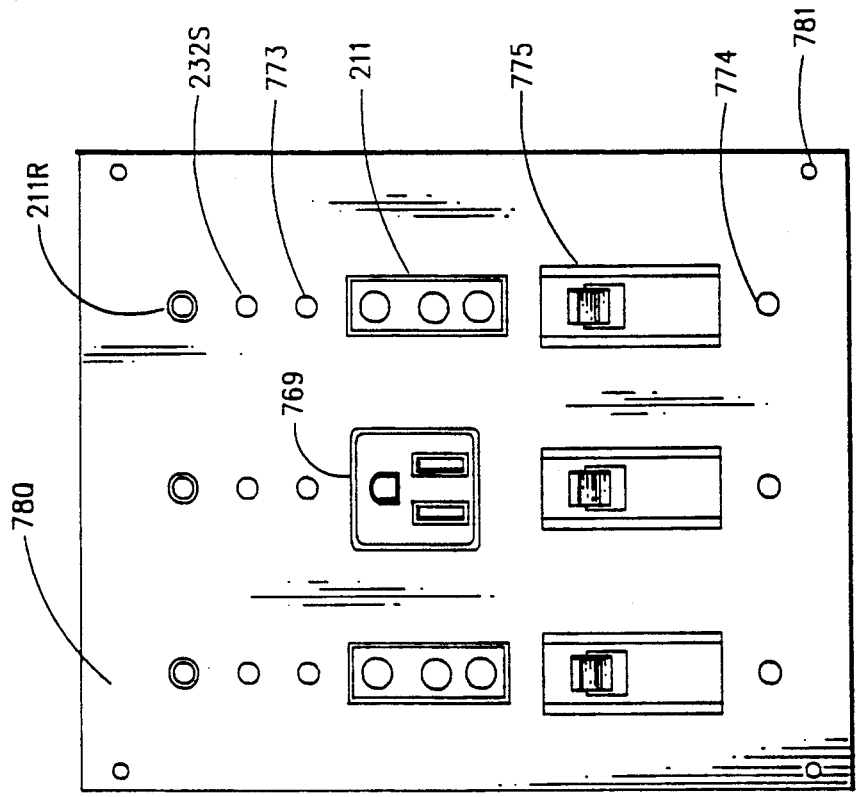
FIG. 7B is a front elevation of the backbox of the dimmer of FIG. 7A.
Figure 7A:
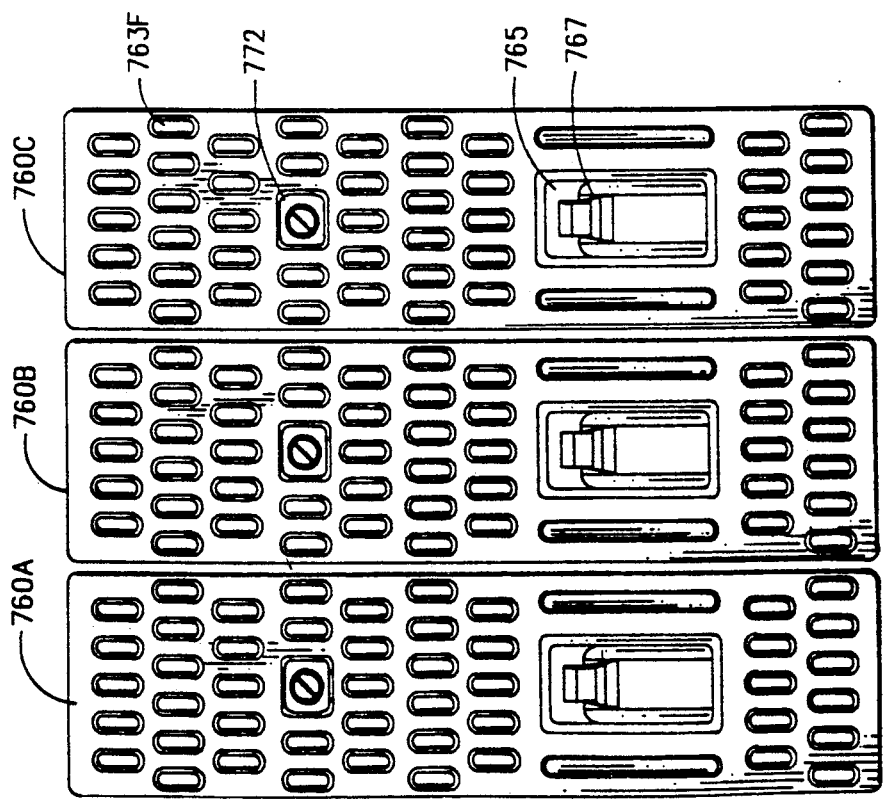
FIG. 7A is a front elevation of a fourth mechanical embodiment.

Refer to FIG. 7A and 7B, where a fourth mechanical embodiment is illustrated.

The illustrated embodiment employs cast or extruded modules such as 760C, that incorporate at least the semiconductor power devices. In a manner generally analogous to the embodiment of FIG. 6D and 6E, the module is provided with a male inlet connector and an additional connector or pole for returning the dimmed output. In the case of the instant embodiment, such connectors are mounted to the metal cover plate 780 mounted on a flush or surface mounted backbox by means of mounting holes 781. The panel is further illustrated as mounting circuit breakers 775, such that the panel may be supplied with a single, relatively large service (e.g. 60A) and itself provide the branch circuit protection required by electrical code for a plurality of smaller capacity dimmers. The illustrated module provides a well that protects and encloses the handle of circuit breaker 775, that well further provided with a web 765 that extends under the breaker handle in the "on" position, such that the module cannot be inserted or removed without the breaker handle being turned off. Panel 780 mounts power outlets 211 that permit the user to plug directly into the panel for "hot-pockets", as well as return receptacle 211R that is connected to a remotely located lamp load. .Control signals are coupled to the electronics on the module via a contact or LED at 232S. The module is aligned with the plate 780 by means of a latch 772 and pin engaging holes 773 and 774 respectively. Other means may be provided, and the functions of the power inlet, power return, and control signal connectors may be combined as previously described and illustrated. The power outlet connector may also be mounted on the module. Similarly, the use of a standard Edison parallel-blade connector 769 for module 760B is shown, illustrating that such Edison connectors (or corresponding English or European power connectors) can also be employed for this or the previous embodiments.

PHYSICAL EMBODIMENT OF FIG. 8A-8F

Finally, while distributed dimmer systems packaging dimmers for use with a lamp support and on regular mounting centers are practical for certain types of touring systems, they are not as practical for many touring theatrical productions, that vary the number and mounting centers of fixtures per mounting position as well as the arrangement of fixtures at the mounting position itself.

A theatrical production may, for example, hang fixtures on 18″ centers on one pipe and on 24″ centers on another, while requiring clumps of three circuits at borderlight pigtails. The production may pack one pipe with fixtures, while using less than a half-dozen on another; sidearm a single vertical row of fixtures on the downstage boom and a double row in the boxes It will be apparent that, on one hand, a system of dimmers on fixed mounting centers and/or in an elongated housing is impractical for many of these variations, while a system of single dimmer enclosures as illustrated in FIG. 3A-4C requires an undesirably large number of discrete supply cables and connections.

Refer now to FIG. 8A-8D where a fifth mechanical embodiment is illustrated that provides a single enclosure design equally suited to each such variation.

Figure 8C:
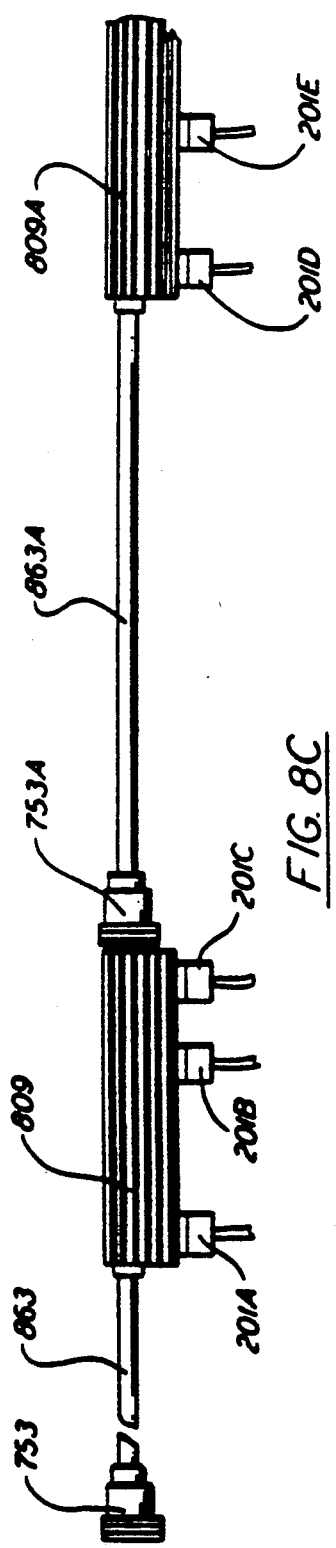
FIG. 8C is a plan view illustrating one application of the embodiment of FIG. 8A.
Figure 8D:
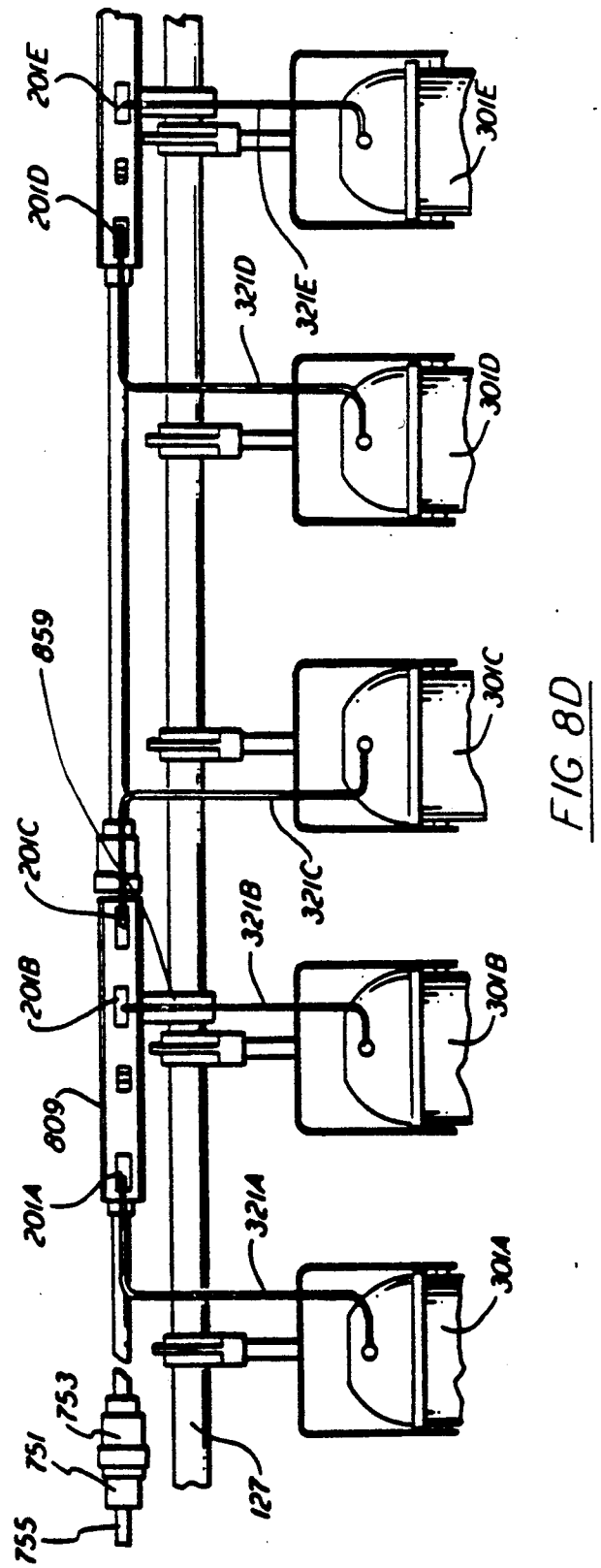
FIG. 8D is a front elevation of FIG. 8C.

FIG. 8A is a plan view of the embodiment. FIG. 8B is a front elevation. FIG. 8C is a plan view illustrating one application of the embodiment FIG. 8D is a front elevation of FIG. 8C.

Enclosure 809 contains three discrete power stages, supplying receptacles 211A, 211B, and 211C respectively. Male multi-pole multi-connector 753 supplies both signal and three-phase 120/208 volt power, to which both the dimmers and a female multi-pole receptacle 752 are parallelled, the latter so that additional enclosures may be "daisy-chained" to the same cable (e.g. enclosures 809 and 809A both supplied by cable 755). One power stage is connected to each of the three phases.

Many designs for enclosure 809 are possible, and should not be understood as limited except by the claims. Heat sink fins 817 or "pin fins" 818 may be provided, and a common chassis used for all three power stages, or each power stage packaged on a removable submodule (e.g. 819).

The embodiment illustrated employs a single membrane switch panel 820, as manufactured by the Xymox Division of W. H. Brady Co., Milwaukee, Wisconsin 53201, which provides test buttons such as 320 and transparent portions for signal and power indicators such as 318 and 320, which may mount to a printed circuit card beneath it. The function of address thumbwheel switch 315 in the previous Figures is performed by the combination of an up/down counter responsive to up/down buttons 816 and display 815, a two-digit 7-segment LED array. To prevent accidental changes in address, a "set" button 817 is provided which must be depressed to enable up/down buttons 816.

Referring now to FIG. 8C and 8D, enclosure 809 may be mounted to a pipe (or any similar support) using a clamp 859. In contrast to the boxy enclosures which have previously been disclosed, the improved dimmer of the present invention can be installed in an enclosure of minimal size, whose elongated shape minimizes obstructions and locates receptacles 211A-211C such that all three fixtures supplied by the enclosure (e.g., 301A, 301B, and 301C) may be plugged into the receptacles without the requirement for an extension cable. Further, adjusting the distance between two enclosures (e.g., 809 and 809A), allows adapting to a variety of fixture mounting centers.

While inlet multi-connector 753 could be panel-mounted, it is preferably installed at the end of a pigtail comprising a length of flexible conduit 863 containing the required power and signal conductors 861, attached to enclosure 809 via hub 865. Plugging the male inlet connector 753 of one enclosure (e.g., 809A) into the female receptacle 752 of a second enclosure (e.g., 809) connects the two without the requirement for a separate jumper and automatically spaces the two enclosures by the distance required to accomodate the regular mounting centers of fixtures 301A-301E. It will be apparent that the combination of the enclosures of FIG. 8A-8D with multi-conductor and conventional stage pin connector equipped cables, provides a uniquely efficient method of dimming fixtures on pipes and similar elongated supports, whether packed together on regular centers or widely and irregularly spaced apart.

It will further be apparent that a single such enclosure can be located on the ground or in the air wherever a borderstrip or cyclorama light requires three circuits, and that the same enclosure, oriented vertically, singly or in pairs, is equally applicable to booms and similar vertical positions.

The use of a plug-through design permits most efficient use of a cable, as any number of enclosures can be "daisy-chained" to the maximum capacity of the supply cable 755. Thus, given a supply cable rated at 20 Amperes, one enclosure can control three 20A loads, two enclosures can control six 1000-watt fixtures, and a third enclosure can be added when 750-watt fixtures are employed.

The use of three-phase power makes most efficient use of the cable by minimizing the number of conductors required, while employing three power stages per enclosure evenly distributes the load—and provides the maximum number of outputs which a single enclosure can supply to almost any arrangement of fixtures without the requirement for extension cables.

The illustrated embodiment offers a heretofore unattained combination of benefits. In contrast to present professional practice which requires the time consuming preparation of single or multiple circuit cables of the correct length, carefully identified with the required circuit number, and the use of large, heavy, and expensive dimmer racks in a central location; a user of a dimming system of the illustrated embodiment present invention need do little more than circle triplets of fixtures on the light plot and order a corresponding number of enclosures, along with an assortment of cables. At the load-in, enclosures are simply clamped to the mounting positions and their addresses set, then connected with one or more portable circuit breaker panels located for maximum convenience, using multi-conductor cables which need not even be identified. The resulting system not only requires less labor to prepare and install, but less capital to build, due to the dramatically less expensive cable and multi-connectors which can be employed as well as the savings produced by the replacement of the large and mechanically complex racks.

The same cables can be used to supply motorized and automated fixtures, which may be "daisy-chained" in series with dimmer enclosures. By rotating the phase conductors between the inlet and outlet connectors of such a fixture, the load presented by multiple such fixtures on a common multicable can be equalized.

Figure 8E:
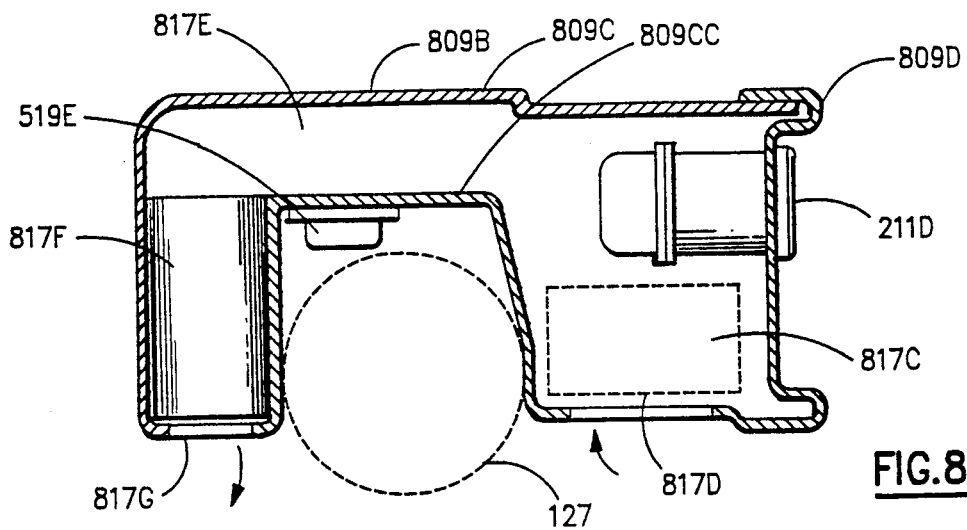
FIG. 8E is a section through a second variation of a dimmer enclosure adapted for portable theatrical use.
Figure 8F:
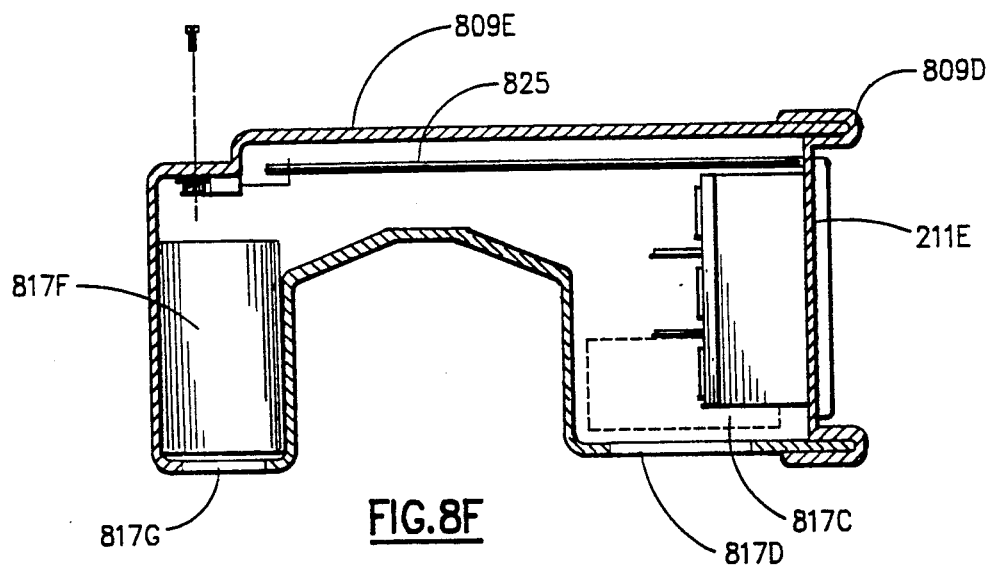
FIG. 8F is a section through a third variation of a dimmer enclosure adapted for portable theatrical use.
Figure 8F:
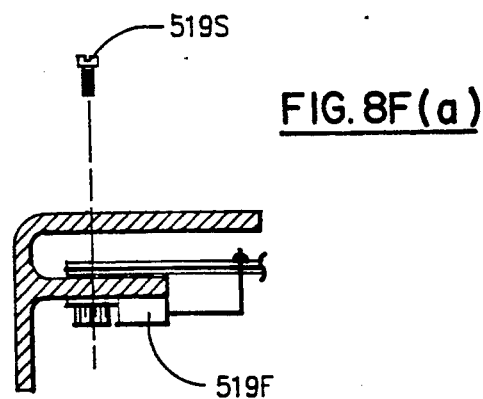

FIG. 8E and 8F illustrate variations designed to nest over the pipe 127 from which the fixtures are hung. Because such enclosures must fit between the clamps used for the fixtures, the length of the enclosures should be reduced below the minimum fixture mounting centers expected. Both variations also employ forced-air cooling, by means of miniature fan 817D, which draws air through opening 817D and pressurizes the interior volume of the enclosure. The enclosure further includes heat sink fins 817F thermally-coupled to the surface mounting semiconductor power device 519E or 519F. Thermal losses from the devices are radiated to free air from the external surfaces of the enclosure, while the passage of air through the interior volume of the enclosure and through the heat sink 817F and out outlet 817G improves heat transfer.

Enclosures 809B and 809C may be retained on pipe 127 by a mechanical clamp and/or a magnet.

The preferred embodiments disclosed are intended for purposes of illustration, and it will be apparent to those of skill in the art that other variations, combinations, and embodiments are possible within the spirit and scope of the inventions.

The triggering circuits may be located remotely from the power stage.

Parallel, serial, or wireless transmission (including power line, infrared, or ultrasonic) of control signals may be employed.

Signal and power conductors for any of the embodiments may be combined in common cable and/or connector assemblies, or separate cables/and or connector assemblies may be employed.

The power stage, triggering, and/or transition control means may be integrated in a single semiconductor package.

While the preferred embodiment illustrated is for a power stage having an AC output, it will be understood in the context of U.S. Pat. No. 4,438,356 that rectification could be employed such that the output of the power stage would be DC. Such an arrangement would further reduce audible lamp noise, while its use in a distributed application eliminates the requirement for DC rated connectors and two-wire operation except at the fixture, while simplifying the operation of arc-detection circuitry, if employed.

The combination of rectification with a filter capacitor and voltage feedback would offer the further prospect of compensating for voltage drop to maintain full RMS voltage at the lamp.

Other variations may be made without departing from the spirit of the invention, which should not be understood as limited except by the claims.

What is claimed is:

1. An electronic dimming apparatus comprising:
   semiconductor power controlling means for selectively coupling a lamp load with an alternating current supply;
   means, having an output coupled to said semiconductor power controlling means, for varying the amount of power supplied to said lamp load over a range of power by controlling the fraction of a half-cycle of the waveform of said alternating current supply in which said semiconductor power controlling means couples said lamp load with said alternating current supply, said means for varying having:
   an input for a first value, said first value indicative of a desired amount of power to be supplied to said lamp load;
   digital means for substituting a second value for said first value;
   means for inputting a third value indicative of the actual amount of power supplied to said lamp load; and
   means, responsive to at least said second value and said third value and operatively coupled with said output, for adjusting said fraction so as to minimize a difference between said desired and said actual amounts of power.

2. The apparatus according to claim 1, wherein said means for varying stabilizes the RMS voltage supplied to said lamp load for a given said first value.

3. The apparatus according to claim 1, wherein said means for varying permits selecting one of a plurality of different relationships over said range between said first value and said second value, such that one of a plurality of different relationships over said range between said first value and said actual amount of power is selected.

4. The apparatus according to claim 3, wherein said selection is afforded by a plurality of stored sets of second values.

5. An electronic dimming apparatus, comprising:
   a semiconductor power controlling means having a control input and coupled with a power input from an alternating current supply and a power output suitable for coupling to a lamp load, said semiconductor power controlling means adapted to vary the instantaneous amplitude of the voltage or current supplied to said lamp load between at least a substantially conductive and a substantially non-conductive power condition;
   means for triggering having an output coupled to said control input of said semiconductor power controlling means, said means for triggering variably controlling the average power supplied to said lamp load over a range of power by varying the phase angle of a half-cycle of the alternating current waveform at which said semiconductor power controlling means changes from one of said power conditions to the other one of said power conditions, said means for triggering having an input and responsive to a value at said input indicative of a desired amount of power to be supplied to said lamp load, said means for triggering providing analog negative feedback having high loop gain across substantially the entire said range of variability of power comparing the actual amount of power supplied to said lamp load with said desired amount of power to determine any difference and altering said phase angle so that said actual amount tends toward said desired amount;

said means for triggering digitally substituting a compensated value for said input value; and said feedback being responsive to said compensated value.

6. The apparatus according to claim 5, wherein
a means is provided for the distribution of at least said alternating current supply to said power input;

a mechanical interface is located between said dimming apparatus and said means for distribution;

electrical isolation is provided between said dimming apparatus and a source of said value indicative of a desired amount of power by a separable coupling across said mechanical interface and prior to said means for triggering.

7. A method of controlling the phase angle at which a lamp dimmer having an input changes the conductive condition of a semiconductor power controlling means to provide a lamp load with a desired amount of average power within a range of possible average power amounts, comprising the steps of:

inputting a first value via said input, said first value identifying an amount of average power desired for said lamp load;

providing said lamp load with power;

inputting a second value indicative of the actual amount of power supplied to said lamp load;

digitally deriving from said first value a third value;

employing analog feedback having a high loop gain comparing said third value and said second value to determine any difference between said actual and said desired amounts of power;

altering said phase angle so as to minimize said difference.

8. The method according to claim 7, wherein the relationship between said first value identifying a level of desired average power and a corresponding third value substantially compensated for the effects of said high loop gain.

9. Lighting control apparatus comprising:
a substantially rigid housing;
at least one enclosure engaging said housing, said enclosure containing at least one dimmer;

said dimmer including a semiconductor power controlling means and a means for triggering, said semiconductor power controlling means coupled with a power input from an alternating current supply and a power output suitable for coupling to a lamp load, said means for triggering variably controlling the average power supplied to said lamp load over a range of power by adjusting the relative proportion of a half-cycle of the alternating current waveform in which said semiconductor power controlling means is in a substantially conductive versus a substantially non-conductive power condition;

said means for triggering having a first signal input and responsive to at least one value received at said first signal input as indicative of a desired level of average power to be supplied to said lamp load;

said housing distributing to said dimmer in said enclosure at least said alternating current supply and said value;

said alternating current supply being coupled between said housing and said enclosure by mating power contacts; and said value being coupled between said housing and said first signal input of said at least one dimmer in said enclosure via a separable electrically isolating coupling.

10. The apparatus according to claim 9, wherein said separable electrically isolating coupling comprises at least one effective source carried by said housing and at least one detector carried by said enclosure.

11. The apparatus according to claim 10, wherein said source emits light.

12. The apparatus according to claim 9, wherein signals modifying parameters of the light output of said lamp load in addition to intensity are coupled via said coupling.

13. The apparatus according to claim 9, wherein there are a plurality of said enclosures, each engaging said housing.

14. The apparatus according to claim 13, wherein said separable electrically isolating coupling comprising at least one detector carried by each of said enclosures and at least one source;

said source having an output common to said detectors of a number of said enclosures.

15. The apparatus according to claim 14, wherein the internal volume of said housing conveys said output of said common source to said detectors of said number of said enclosures.

16. The apparatus according to claim 14, wherein said source emits light.

17. The apparatus according to claim 16, wherein a material conducting light conveys said output of said source to said detectors.

18. Lighting control apparatus comprising:
a substantially rigid housing;
a plurality of enclosures engaging said housing, each of said enclosures containing at least one dimmer;

said dimmer including a semiconductor power controlling means and a means for triggering, said semiconductor power controlling means coupled with a power input from an alternating current supply and a power output suitable for coupling to a lamp load, said means for triggering variably controlling the average power supplied to said lamp load over a range of power by adjusting the relative proportion of a half-cycle of the alternating current waveform in which said semiconductor power controlling means is in a substantially conductive versus a substantially non-conductive power condition;

said means for triggering having a first signal input and responsive to at least one value received at said first signal input as indicative of a desired level of average power to be supplied to said lamp load;

said housing distributing to said dimmer in each said enclosure at least said alternating current supply and said value;

said alternating current supply being coupled between said housing and each said enclosure by mating power contacts; and said value being coupled between said housing and said first signal input of said at least one dimmer in each said enclosure via a separable electrically isolating coupling.

19. The apparatus according to claim 18, wherein said separable electrically isolating coupling comprises at least one detector carried by each of said enclosures and at least one source; and said source having an output common to said detectors of a number of said enclosures.

20. The apparatus according to claim 19, wherein the internal volume of said housing conveys said output of said common source to said detectors of said number of said enclosures.

21. The apparatus according to claim 19, wherein said source emits light; and a medium conducting light conveys said output of said source to said detectors;

22. The apparatus according to claim 21, wherein said source and said power contacts are combined in a common mechanical assembly.

23. The apparatus according to claim 22, wherein said common mechanical assembly is suitable for insertion in said housing.

24. The apparatus according to claim 18, wherein signals modifying parameters of the light output of said lamp load in addition to intensity are coupled via said coupling.

* * * * *